US011836786B2

(12) United States Patent
Nelson et al.

(10) Patent No.: US 11,836,786 B2
(45) Date of Patent: Dec. 5, 2023

(54) SYSTEM FOR FACILITATING DRIVE UP ORDER FULFILLMENT

(71) Applicant: Target Brands, Inc., Minneapolis, MN (US)

(72) Inventors: Ted Nelson, Minneapolis, MN (US);
Jathin Jayan, Minneapolis, MN (US);
Roy Tewalt, Minneapolis, MN (US);
Andy Rudge, Minneapolis, MN (US);
Adam May, Eden Prairie, MN (US);
Josiah Gulden, Minneapolis, MN (US);
Dan Carlson, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/105,666

(22) Filed: Feb. 3, 2023

(65) Prior Publication Data

US 2023/0186372 A1    Jun. 15, 2023

Related U.S. Application Data

(63) Continuation of application No. 16/913,218, filed on Jun. 26, 2020, now Pat. No. 11,574,265.

(Continued)

(51) Int. Cl.
*G06Q 30/0601* (2023.01)
*G06Q 10/0836* (2023.01)
(Continued)

(52) U.S. Cl.
CPC ....... *G06Q 30/0635* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS 9,633,389 B2    4/2017  Carr et al.
10,482,421 B1 *  11/2019  Ducrou .................. G06V 20/54
(Continued)

FOREIGN PATENT DOCUMENTS

WO    WO 2016/036501    3/2016

OTHER PUBLICATIONS

CNBC.com [online], "Like it or not, 'click and collect' is here to stay," Jan. 14, 2016, retrieved on Dec. 12, 2018, retrieved from URL <https://www.cnbc.com/2016/01/13/like-it-or-not-click-and-collect-is-here-to-stay.html>, 11 pages.

(Continued)

*Primary Examiner* — Cory W Eskridge
(74) *Attorney, Agent, or Firm* — Fish & Richardson P.C.

(57) ABSTRACT

A network based order fulfillment systems having an improved user interface at both a customer device and at an order fulfillment location employee device. Both customer and employee devices scan collect user input and other information using one or more sensors of the user devices to provide proper notifications to both the customer and the employee based on the actions of each. Location information for a customer computing device can be used to continually update ETA and time since arrival information displayed at the employee's computing device.

21 Claims, 11 Drawing Sheets

Employee's Device

Related U.S. Application Data

(60) Provisional application No. 62/866,834, filed on Jun. 26, 2019.

(51) Int. Cl.
  *G06F 3/0484* (2022.01)
  *G06F 3/0482* (2013.01)
  *G06F 40/109* (2020.01)
  *G06F 3/04817* (2022.01)

(52) U.S. Cl.
  CPC ....... *G06F 40/109* (2020.01); *G06Q 10/0836* (2013.01); *G06F 3/04817* (2013.01)

(56) References Cited

U.S. PATENT DOCUMENTS

| | | |
|---|---|---|
| 11,574,265 B2 | 2/2023 | Nelson et al. |
| 2006/0076397 A1 | 4/2006 | Langos |
| 2006/0178943 A1 | 8/2006 | Rollinson et al. |
| 2009/0228325 A1 | 9/2009 | Simmons et al. |
| 2013/0030955 A1 | 1/2013 | David |
| 2015/0262119 A1 | 9/2015 | Santo |
| 2016/0148300 A1 | 5/2016 | Carr et al. |
| 2016/0247113 A1* | 8/2016 | Rademaker .......... G06Q 10/083 |
| 2017/0024805 A1 | 1/2017 | Tepfenhart et al. |
| 2017/0262929 A1 | 9/2017 | Degraeve |
| 2017/0337523 A1 | 11/2017 | Roach et al. |
| 2017/0372388 A1 | 12/2017 | Branham et al. |
| 2018/0082356 A1 | 3/2018 | Wilkinson et al. |

OTHER PUBLICATIONS

Mobilepaymentstoday.com [online], "Instacart expands mobile app-based grocery pickup and delivery nationwide," Nov. 7, 2018, retrieved on Dec. 12, 2018, retrieved from URL <https://www.mobilepaymentstoday.com/news/instacart-expands-mobile-app-based-grocery-pickup-and-delivery-nationwide/> 2 pages.

Shop.Cub.com [online], "Introducing Store Pickup," 2018, retrieved on Dec. 12, 2018, retrieved from URL <https://www.cub.com/online-ordering/store-pick-up.html>, 4 pages.

Walmart.com [online], "Store Pickup Mobile Check-in," 2018, retrieved on Dec. 12, 2018, retrieved form URL <https://help.walmart.com/app/answers/detail/a_id/4/~/store-pickup-mobile-check-in>, 5 pages.

Walmart.com [online], "Walmart Online Grocery Pickup," Jun. 3, 2016, retrieved on Dec. 12, 2018, retrieved from URL <https://news.walmart.com/2016/06/03/walmart-online-grocery-pickup>, 5 pages.

\* cited by examiner

Employee's Device

Customer's Device

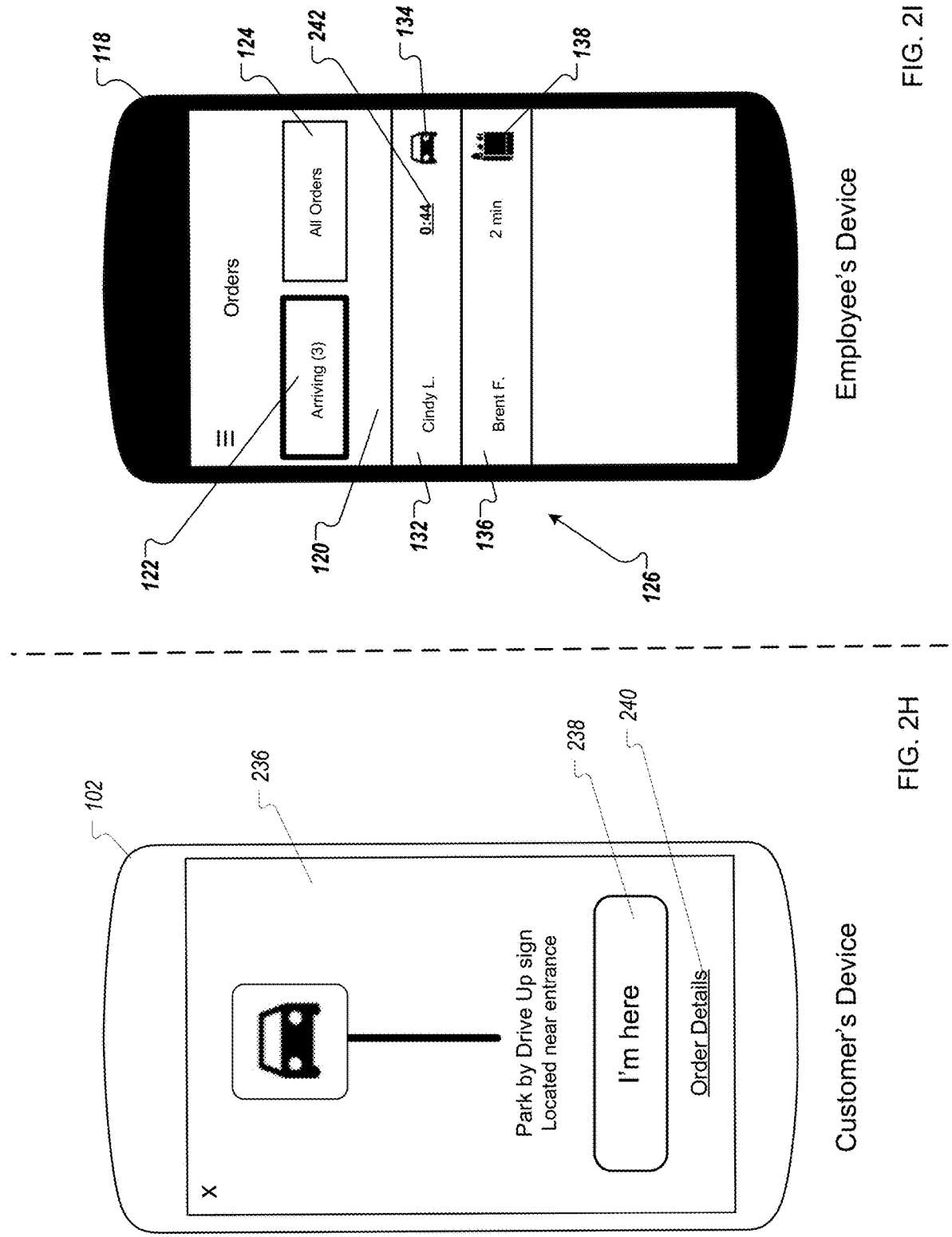

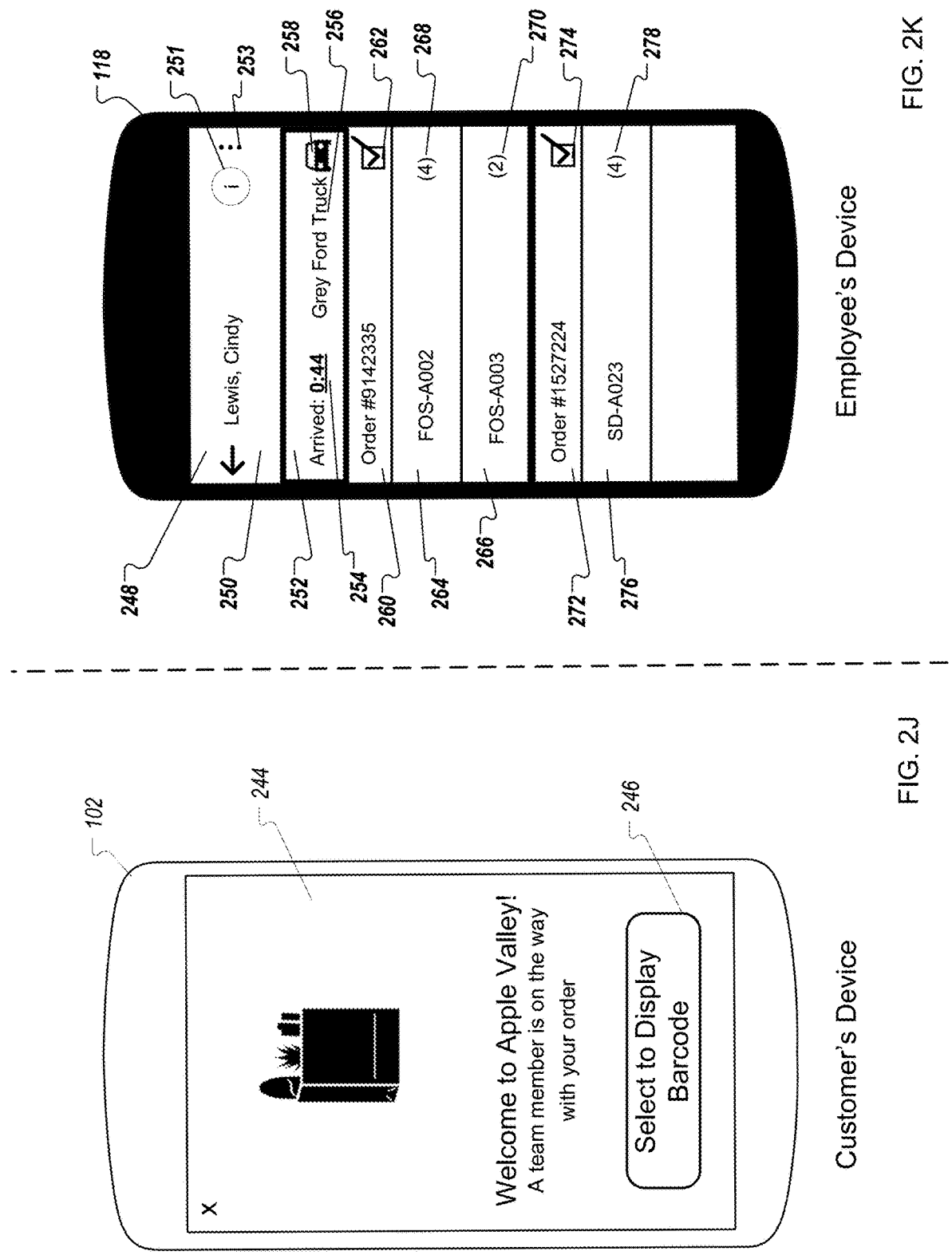

SYSTEM FOR FACILITATING DRIVE UP ORDER FULFILLMENT

CROSS REFERENCE TO RELATED APPLICATIONS

This application is a continuation of U.S. Utility application Ser. No. 16/913,218, filed Jun. 26, 2020, which claims the benefit of U.S. Provisional Application Ser. No. 62/866,834, filed Jun. 26, 2019. The disclosures of the prior applications are considered part of (and are incorporated by reference in) the disclosure of this application.

TECHNICAL FIELD

This document generally relates to architecture of computer systems, communications between computing devices, and graphic user interfaces for eliciting user input.

BACKGROUND

Computing devices are devices that accept data input, process the data, and provide data output using hardware and software. Computing devices can communicate with other computing devices using wired or wireless networks or a combination thereof. For example, computing devices can communicate over the Internet. User interactions with a computing device can cause the computing device to transmit communications to a second computing device, which can cause the second computing device to provide output such as changes to a visual display, sounds, or tactile output. Such output at the second computing device can elicit user input from a user of the second computing device which can in turn cause the second computing device to transmit one or more communications to the first computing device thereby causing the first computing device to generate additional output.

SUMMARY

This document generally describes a network based order fulfillment systems that provides information to one or more user devices that allow users of the user devices located at a fulfillment location (such as a physical store location, a restaurant, a warehouse, or other location) to fulfill orders placed by users of other user devices. For example, a first user device can collect user input and other information using one or more sensors of the user device to identify items that a first user wishes to purchase from a store, the first user's progress in traveling to the store, and other information about the first user and the first user's order. The first user's device can provide this information to a user device of a worker at a fulfillment location to allow the worker to fulfill the order in a timely manner and provide the items in the order to the first user upon arrival of the first user at the fulfillment location. The worker can interact with her user device to cause the worker's device to update a status of the order and provide information to the first user's device which can cause the first user's device to provide additional information to the first user. In one aspect, the first user's device can provide a user interface that includes a unique optically recognizable code (e.g., a barcode or a matrix barcode) that can be used to verify the first user's identity, the first user's order number, or other information associated with the first user or the order. The worker's device can provide instructions to the first user for scanning, or otherwise verifying, the optically recognizable code. The worker can then use her device to scan the optically recognizable code displayed by the first user's device to verify the first user's identity or an aspect of the first user's order.

In another aspect, information collected at the first user's device (e.g., from user input or via a location detection unit such as a GPS unit of the user's device) can be transmitted to the worker's device to cause the worker's device to provide an indication that the first user has begun to travel to the fulfillment location. The worker's device can also display an estimated arrival time or estimated time until arrival at the fulfillment location for the first user. For example, the first user's device can determine that the first user has begun to travel to the fulfillment location. The first user's device can transmit a communication to the worker's device indicating that the first user has begun traveling to the fulfillment location. The worker's device can provide an estimated time until arrival at the fulfillment location for the first user. Upon the user arriving at or near the fulfillment location, the first user's device can transmit a communication to the worker's device indicating that the user has arrived. This can cause the worker's device to display a count up timer indicating how long the first user has been waiting for her order after arriving at the fulfillment location. In some implementations, if the count up timer reaches a preset threshold, a customized notification can be provided to the first user's device to indicate a status of the order, indicate additional instructions for the first user, or communicate another message to the first user.

In another aspect, a user interface provided at the first user's device can provide one or more controls for altering aspects of an order after the first user has placed the order. For example, the user interface can allow the first user to add additional items to the order or remove items from the order. As another example, the user interface can allow the first user to indicate substitute items for items from the original order that are not available. As another example, the user interface can allow the first user to switch the order type from a drive-up type order to an in-store pick up order.

In one aspect, in general, a method includes receiving, by a first computing device, a first communication indicating that a second computing device has begun to travel toward an order fulfillment location; receiving, by the first computing device, information indicating an estimated time until arrival at the order fulfillment location by the second computing device; providing, by the first computing device and in response to receiving the first communication indicating that the second computing device has begun to travel toward the order fulfillment location, a user interface that includes a timer indicating the received estimated time until arrival; receiving, by the first computing device, a second communication indicating that the second computing device has arrived at the order fulfillment location; and updating, by the first computing device and in response to receiving the second communication indicating that the second computing device has arrived at the order fulfillment location, the timer included as part of the user interface to indicate a time since arrival of the second computing device at the fulfillment location.

The method can further include, after receiving the information indicating the estimated time until arrival and prior to receiving the second communication, receiving, by the first computing device, a third communication indicating a new estimated time until arrival at the order fulfillment location by the second computing device. In some cases, the first computing device can, in response to receiving the third communication, update the timer included as part of the user interface to indicate the new estimated time until arrival.

The method can further include after updating the timer to indicate the time since arrival of the second computing device at the fulfillment location, determining that the timer has reached a predetermined time. The method can also include in response to determining that the timer has reached a predetermined time, changing a visual appearance of the timer on the user interface. The method can include, in response to determining that the timer has reached a predetermined time, causing a communication indicating an order status to be transmitted to the second computing device.

In some cases, the user interface can further include an indication of an order fulfillment type for an order associated with the second computing device, wherein the order fulfillment type has previously been indicated by a user of the second computing device. The method can further include receiving, by the first computing device, a third communication indicating a change in order fulfillment type for the order associated with the second computing device. The first computing device can update the user interface to indicate the change in order fulfillment type for the order associated with the second computing device. In some cases, the change in order fulfillment type can be a change from a drive-up order to an in-store pickup order. In some cases, the indication of an order fulfillment type can take the form of an order fulfillment type icon and indicating the change in order fulfillment type can include changing the order fulfillment type icon.

The systems, devices, program products, and processes described throughout this document can, in some instances, provide one or more of the following advantages. By providing streamlined communications between mobile devices operated by users/customers and employees working at fulfillment locations, an order fulfillment system can reduce the amount of time spent interacting with the mobile devices, thereby reducing power consumption and improving battery life of the computing devices. Additionally, by streamlining communications while providing for computer network based ordering and pick-up facilitation, the computing system can reduce the amount of communications to and from mobile computing devices, thereby reducing bandwidth usage of one or more communications networks and freeing up communications bandwidth for other purposes. Additionally, unique user interface elements at mobile computing devices of both users/customers and employees of fulfillment locations can improve user experience thereby leading to improved outcomes with respect to efficiency and accuracy of both user interactions with the mobile computing devices and fulfillment of orders. Other benefits and advantages will be apparent from the following descriptions.

DESCRIPTION OF DRAWINGS

Like reference symbols in the various drawings indicate like elements.

DETAILED DESCRIPTION

Figure 1:
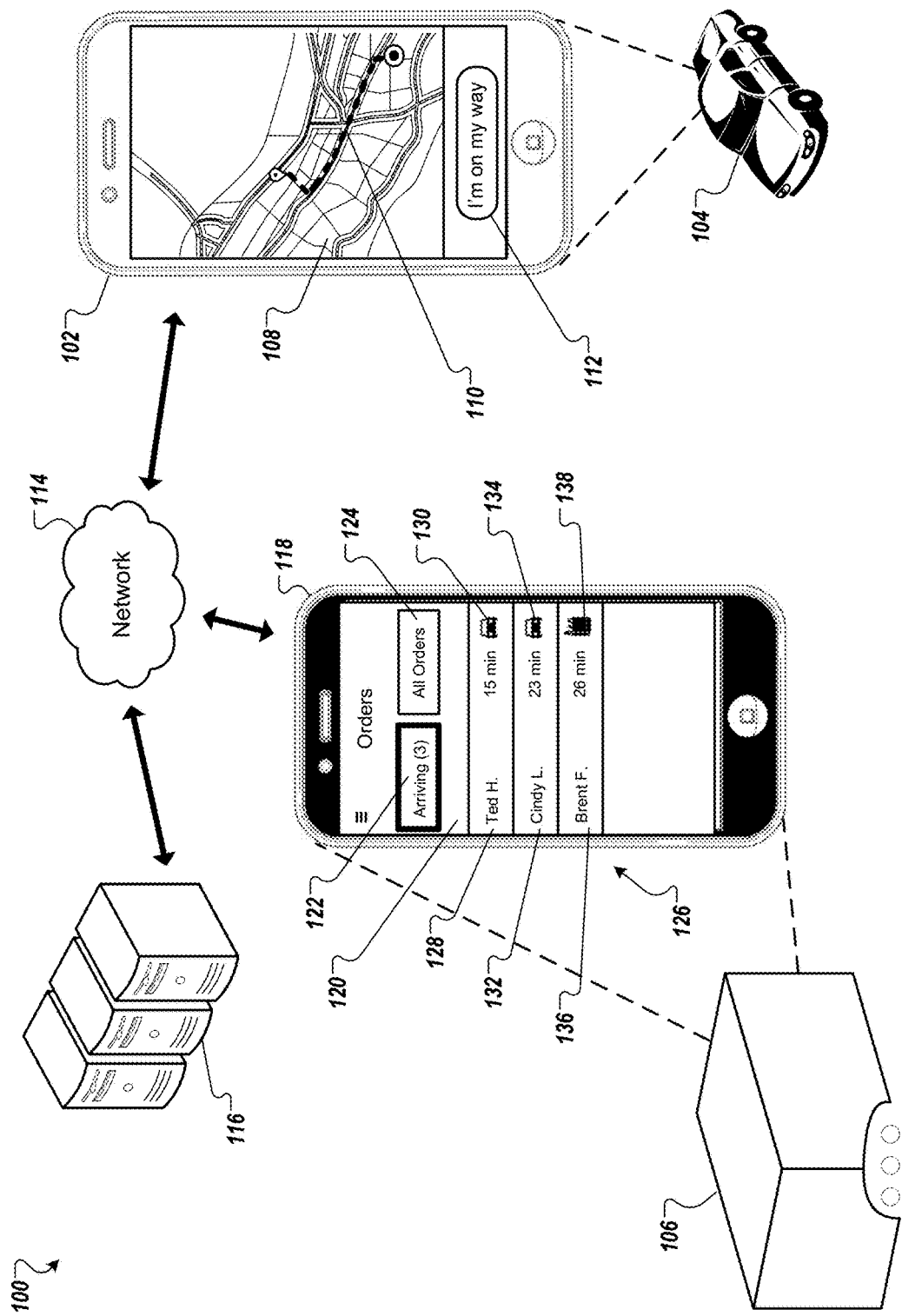
FIG. 1 is diagram of an example system for facilitating drive-up order fulfillment.

FIG. 1 is a diagram of an example system 100 for facilitating order fulfillment for drive-up pickup by user's.

In the system 100, a user, such as a customer who wishes to complete an online order for items by picking up the items using a drive-up service, can access a dedicated application executing on a mobile device 102. The mobile device 102 can be, for example, a mobile phone, a tablet device, a touch screen computer, a laptop computer, a PDA, a smart watch, or other mobile device. In some implementations, instead of accessing a dedicated application executing on the mobile device 102, the user can use a browser of the mobile device 102 to access a website that provides the below described functionality and therefore all descriptions related to use of the dedicated application apply equally to a web-based implementation.

The user logs into the dedicated application by entering a user name or other identifier and a password. Alternatively, the user can log into the dedicated application by providing biometric information using one or more sensors of the mobile device 102 such as by scanning a fingerprint using a fingerprint scanner of the mobile device 102 or using a retina scanner of the mobile device 102 to scan the user's retina information. In some implementations, the user may be already logged into the dedicated application from a previous session.

The user can use the dedicated application to select items for purchase from a store using an online shopping interface. For example, the dedicated application can be a grocery shopping application that can permit the user to search and/or browse for grocery items, add desired items to a virtual shopping cart, and place an order for the selected items by entering payment information. The user can also use the dedicated application to access one or more previously entered orders. For example, a user may have previously logged into an online account for a retailer associated with the dedicated application and placed an on-line order for one or more items using either the mobile device 102 or a different computing device such as a home or laptop computer. As another example, the user may have previously placed an on-line order using the dedicated application. The user can access and review the previously placed orders after logging into the dedicated application. This can include reviewing items included in the orders, estimated time until the order is ready, payment used for the order (e.g., "card ending in 123"), a fulfillment location for the order, and other information associated with the orders.

The mobile device 102 can communicate with other computing devices through a network 114, such as, for example, the Internet. For example, the mobile device 102 can communicate with a network access point such as a WiFi router or a cellular communication tower to access the network 114 and communicate with other computing devices. For example, the mobile device 102 can communicate with a server system 116 consisting of one or more servers to place the order. Alternatively, or additionally, the user can use a different computer to place the order and the different computer can communicate through the network 114 with the server system 116. The server system 116 can be affiliated with a retailer and process the on-line order received from the mobile device 102 or another computing device. The server system 116 can facilitate fulfillment of the order by providing details of the order, such as ordered items, identity of the user, an order number, time that the order was placed, etc. to one or more computing devices located at a fulfillment center such as a store 106. For example, the store 106 can be part of a chain of affiliated stores associated with a retailer and the server system 116 can be a server system associated with the retailer. Upon receiving an on-line order from the user, the server system 116 can identify the store 106 as an appropriate fulfillment location for the order based on information such as, an indication of a preferred location for fulfillment indicated by the user at the mobile device 102 or another computing device, a current location of the mobile device 102, another location associated with the user (e.g., home or work address information entered by the user into a customer profile), based on item availability (e.g., by identifying a store where all or a majority of the items in the order are in stock), or based on a combination of these and one or more other factors.

For example, the server system 116 can identify the store 106 as an appropriate location for fulfilling the user's order. The server system 116 can transmit information on the order to a computing device 118 in the possession of, or being used by, an employee of the store 106. The computing device 118 can be a mobile computing device, such as, for example, a mobile phone, a tablet device, a touch screen computer, a laptop computer, a PDA, a smart watch, or other mobile device. In some implementations, the computing device 118 can be a non-mobile or semi-mobile device such as a server, a desktop computer, a cash register, a smart TV, or other computing device. The server system 116 can provide appropriate information for the order to the computing device 118 such as items in the order, identifying information for the user who placed the order, time the order was placed, a desired pickup time for the order (e.g., as indicated by the user at the time of placing the order), an order number, and other relevant information.

At the time of placing the order, or at a different time, such as when logging into the dedicated application, the user of the mobile device 102 can indicate a desired order fulfillment method for the order. For example, the user can specify that the order is for drive-up fulfillment. A drive-up fulfillment allows the user to drive to a fulfillment location, such as a retail store location, a warehouse, or another location where an employee of the retailer can meet the user at the user's vehicle 104, verify that the user is receiving the proper order, and provide the items to the user without the user being required to exit his vehicle. For example, the user can travel to the store 106, park in a designated area of the parking lot of the store 106, notify an employee that they have arrived (as described in more detail below), and then receive the purchased items from the employee when the employee brings the items to the user's vehicle 104.

As another example, the user can specify that the order is for in-store pickup fulfillment. In-store pickup fulfillment can allow the user to travel to a fulfillment location, such as the store 106, and enter the store to pickup the purchased items from a designated location within the fulfillment location. Such a fulfillment method can allow the user greater flexibility by allowing the user to shop for additional items within the store 106 (e.g., items that the user wishes to see in-person before purchasing, such as clothing or produce) and then pickup the items from the on-line order at the designated location after completing his in-store shopping. Alternatively, the user can pickup the order items without also shopping for items at the store 106 in person.

As another example, the user can specify that the order is for delivery. An employee of the retailer or a third-party service can travel to the user's home or another drop-off location designated by the user to deliver the items in the order to the user.

In some cases, when the user has indicated drive-up or in-store pickup type order fulfillment, the dedicated application can provide navigation directions, such as driving directions, to the fulfillment location (e.g., store 106). For example, the dedicated application can communicate with a native routing application installed on the mobile device 102 or with one or more remote routing servers to identify a route from either the user's current location or a specified starting location to the store 106. As another example, the mobile device 102 can communicate with the server system 116 through the network 114 to receive routing information from either the user's current location or the specified starting location to the store 106. The dedicated application can then, for example, provide a map display 108 showing a route 110 to the store 106. As another example, the dedicated application can provide turn by turn directions to the store 106 using text and/or icons in addition to or in place of the map display 108.

In some implementations, the user can permit the dedicated application to access location information for the mobile device 102. For example, the user can set a permissions setting permitting the dedicated application to access location information for the mobile device 102. In some implementations, the user can specify that the dedicated application is only permitted to access location information for the mobile device 102 when the dedicated application is executing or can specify that the dedicated application is always permitted to access location information for the mobile device 102 even when a user interface for the dedicated application is not open. The mobile device 102 can determine its own location using one or more well-known techniques, such as by using a GPS module for receiving GPS signals from GPS satellites to determine the location of the mobile device 102. The mobile device 102 can also use a wireless communication triangulation technique to determine the location of the mobile device 102. As another example, the mobile device 102 can determine its location based on the location of a network access point that the mobile device 102 is in short range wireless communication with (e.g., a WiFi router). The dedicated application can use the location information to identify a starting location for the route 110, such as the current location of the mobile device 102.

In the case of both drive-up and in-store pickup type order fulfillments, the user can begin to travel to the fulfillment location, such as by driving the vehicle 104 to the store 106. In some implementations, information collected or generated by the mobile device 102 can be used to determine that the user has begun to travel to the order fulfillment location. For example, location information determined by the mobile device 102, as described above, can be used to determine that the mobile device 102 has begun to travel along the route 110. For example, the dedicated application can receive location information for the mobile device 102 over sequential periods of time (e.g., every 2 seconds) and compare the movement of the mobile device 102 based on the changing location information to the route 110 to determine that the user has begun to travel the route 110. Alternatively or additionally, the user can select a user interface control 112 provided by the dedicated application to indicate that he has begun traveling toward the store 106. For example, the user may have selected a permissions setting to not allow the dedicated application to access location information for the mobile device 102. In some implementations, the dedicated application will only display the user interface control 112 in situations in which the user has not permitted the dedicated application to access location information for the mobile device 102. As another example, the mobile device 102 may be unable to accurately determine its location, for example, due to tall buildings interfering with GPS signals or due to lack of wireless communications access points in the area around the mobile device 102. The dedicated application can provide the user interface control 112 when the mobile device 102 is unable to accurately determine the location of the mobile device 102 so that the user can indicate that he has begun to travel toward the store 106.

Upon determining that the user has begun to travel toward the store 106 (e.g., based on location information collected by the mobile device 102 or based on user interaction with the user interface control 112), the mobile device 102 can communicate with one or more computing devices located at and affiliated with the store 106, either directly through the network 114 or by communicating with the server system 116 which in turn communicates appropriate information and instructions to the one or more computing devices located at the store 106. For example, an employee of the store 106 can use the computing device 118, which can receive information relevant to the order from the server system 116. The mobile device 102 can communicate with the server system 116 over the network 114 to indicate to the server system 116 that the user has begun to travel toward the store 106. The server system 116 can then provide a communication to the computing device 118 of the store employee to indicate that the user of the mobile device 102 is on the way. The server system 118 may communicate directly with the computing device 118 through the network 114 or may communicate with a computing device/system located at the store 106 which then communicates with the computing device 118, e.g., through a wireless or wired local area network (LAN). In some implementations, the server system 116 or a central computing device located at the store 106 can communicate with the computing device 118 and one or more other computing devices in possession of other employees of the store 106 to allow multiple employees to receive information on on-line orders placed by customers and coordinate efforts to fulfill such orders.

The server system 116 can provide additional information along with this notification or prior to sending the notification that the user is on the way. For example, the server system 116 can access user profile information to identify a make and model for the user's vehicle 104, a color for the user's vehicle 104, and/or other identifying information for the user's vehicle 104 (such as a whole or partial license plate number) and provide this vehicle identification information to the computing device 118 to allow the employee to more easily identify the user's vehicle 104 when the user has arrived at the designating drive-up fulfillment location at the store 106. The server system 116 can store this vehicle identification information as part of a customer profile for the user or the user can provide the information at the time of placing the order (e.g., in situations where the user is part of a multi-car family and may use different vehicles on different occasions). In some implementations, the user can be prompted to enter such vehicle identification information at the time of placing the order, at the time of selecting drive-up fulfillment for the order, or at the time of indicating that they are on their way. For example, the dedicated application can present a GUI for eliciting vehicle identification information to the user at the time of placing the order, or in response to the user selecting drive up fulfillment or indicating that he is on his way. The GUI can provide user selectable graphics that allow the user to indicate different aspects of the vehicle such as color or vehicle type (e.g., SUV, sedan, mini-van, etc.). The GUI can also provide one or more text fields that allow the user to enter information on the vehicle such as a make and model for the user's vehicle 104, a color for the user's vehicle 104, and/or other identifying information for the user's vehicle 104 (such as a whole or partial license plate number).

The server system 116 can also provide information on an estimated time of arrival and/or an estimated time until arrival for the user. For example, the mobile device 102 can calculate an estimated time until arrival for the user based on the estimated time for traversing the route 110 and provide this information to the server system 116 which can then provide the estimated time until arrival information to the computing device 118. As another example, the server system 116 can receive location information from the mobile device 102 and use this location information to calculate an estimated time until arrival for the user. For example, the user can give the dedicated application permission to access location information for the mobile device 102. A GPS unit or other location detection unit of the mobile device 102 can regularly determine the location for the mobile device 102. At the time of indicating to the server system 116 that the user has begun to travel along the route 110 to the store 106, the mobile device 102 can also indicate the current location of the mobile device 102. The server system 116 can then use either an internal time estimation routine, or communicate with an external routing system to identify an estimated time required for the user to travel from the current location of the mobile device 102 to the store 106 using any one of many known techniques. The server system 116 can then provide this estimated time until arrival information to the computing device 118, which can then provide this information to the employee.

As the user travels along the route 110 (or another route) to the store 106, the server system 116 can periodically receive updated location information from the mobile device 102 (e.g., by periodically querying the dedicated application running on the mobile device 102 for current location information for the mobile device 102). Each time the server system 116 receives updated location information for the mobile device 102, the server system 116 can calculate or otherwise identify (e.g., by communicating with the external routing system) an updated estimated time until arrival for the user, based on the new location information. The server system 116 can then provide the updated estimated time until arrival for the user to the computing device 118. In some implementations, the server system 116 will only provide the updated estimated time until arrival for the user to the computing device 118 if the updated estimated time until arrival differs from the previous estimated time until arrival adjusted for the change in time between the time the initial or previous estimated time until arrival was calculated and the time the updated estimated time until arrival was calculated.

In some implementations, the user may take a different route to the store 106 than the map display 108 indicated by the map display 108. For example, the user may wish to make a stop along the way to store 106 to run a different errand, the user may have a preferred route to the store 106 that is not necessarily the quickest route, the user may wish to take a more scenic route to the store 106, or the user may wish to a sudden change in traffic conditions due to, e.g., an accident. In such scenarios, the server system 116 can continue to receive periodic location information from the mobile device 102 and update the estimated time until arrival for the user based on the new location information for the user along the new route. In some implementations, if the location of the mobile device 102 has strayed from the route 110, the server system 116, a remote mapping system, or a mapping application installed on the mobile device 102 can update the route 110 to indicate a new route from the current location of the mobile device 102 to the store 106 and communicate the updated route to the dedicated application. The dedicated application can then display this updated route on the map display 108.

In some implementations, the user interface of the dedicated application can include one or more additional controls. For example, the user may travel part way to the store 106 and then decide to pick up the order at a different time. The user can select a control indicating that they are no longer enroute to the store 106. The mobile device 102 can then communicate to the server system 116 that the user is no longer on the way to the store 106. The server can then communicate to the computing device 118 that the user is no longer on the way to the store 106 which can allow the employee to focus efforts on fulfilling a different order or performing other tasks.

The computing device 118 includes a user interface 120. The user interface 120 can, for example, be a user interface for another dedicated application executing on the computing device 118 or another instance of the same dedicated application that is executing on the mobile device 102. The user interface 120 includes a user selectable control 122 that allows the employee to view all arriving orders (e.g., orders for which the user is on the way). The employee can select the control 122 by, for example, using a touch screen interface of the computing device 118 or one or more other input devices of or in communication with the computing device 118. The user interface 120 further includes a control 124 to allow the employee to view all placed orders. This could include all orders placed for fulfillment at the store 106 or all orders assigned specifically to the employee for fulfillment. Selection of the all orders control 124 can cause the user interface 120 to display all orders that have been placed for fulfillment regardless of the user's status (e.g., orders for users that are on the way and orders for users that are not yet on the way).

In the example depicted in FIG. 1, the control 122 is selected and the user interface 120 is displaying a list 126 of orders for which the user is currently on the way and/or has already arrived. For example, an order listing 128 in the list 126 includes the user's name associated with the order, an estimated time until the indicated user is predicted to arrive at the store 106 (15 minutes) and an icon 130 indicating that the user associated with the order listing 128 has selected drive-up order fulfillment. Similarly, an order listing 132 indicates that a user named "Cindy L." is estimated to arrive at the store 106 in 23 minutes and includes an icon 134 indicating that Cindy L. has selected drive-up order fulfillment.

The user interface 120 further includes an order listing 136 indicating that a user named "Brent F." is estimated to arrive at the store 106 in 26 minutes and includes an icon 138 indicating that Brent F. has selected in-store pickup order fulfillment. In some implementations, in place of or in addition to the indication of an estimated time until arrival, each order listing can include a time indicator indicating the predicated time of arrival for the customer (e.g., 3:15 pm). In some implementations, the order listings in the list 126 can include less or more details with respect to each order. For example, each order listing can include an order number. As another example, each order listing can include vehicle identification information.

In some implementations, order listings in the list 126 are user selectable to allow the employee to view additional information about each order (as explained in greater detail below). For example, the employee can select the order listing 128 to cause the user interface 120 to display additional information about the order placed by Ted H. (which can be, for example, the user of mobile device 102). Additional details that can be displayed by the user interface 120 in response to selection of the order listing 128 can include an order number, a listing of items in the order, vehicle identification information, special instructions or requests entered by the customer, location information for bag containing the items for the order (e.g., one or more shelf or bin locations at a drive-up order fulfillment staging area), a number of bags for the order, an indication as to whether or not the order includes age restricted items (e.g., cold medicine, alcohol, etc.), and other information for the order.

Figure 2B:
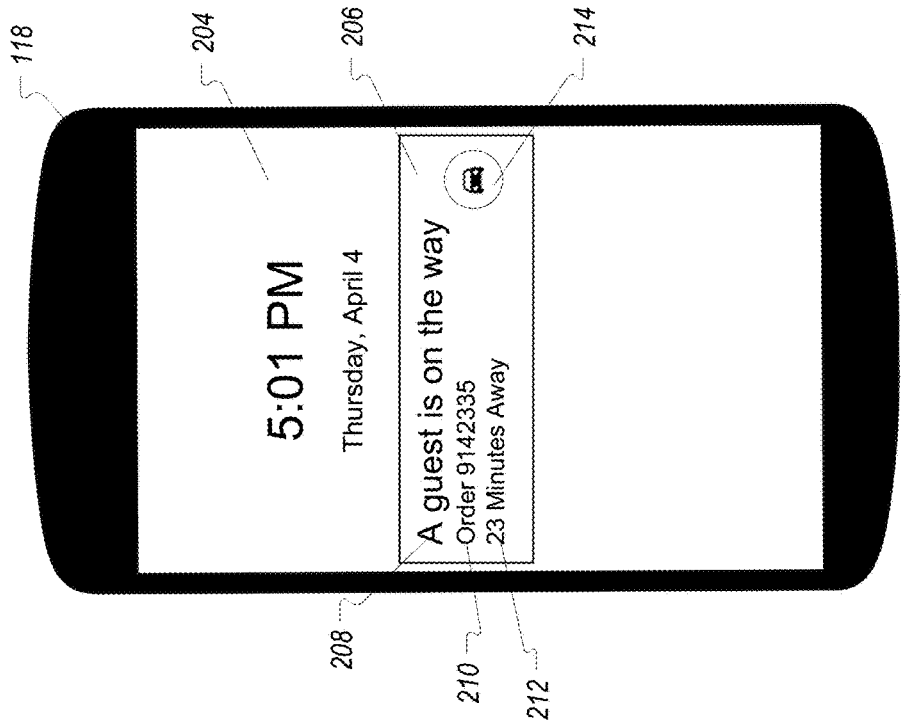
FIGS. 2A-2N show example user interface displays for computing devices in a drive-up order fulfillment system.
Figure 2A:
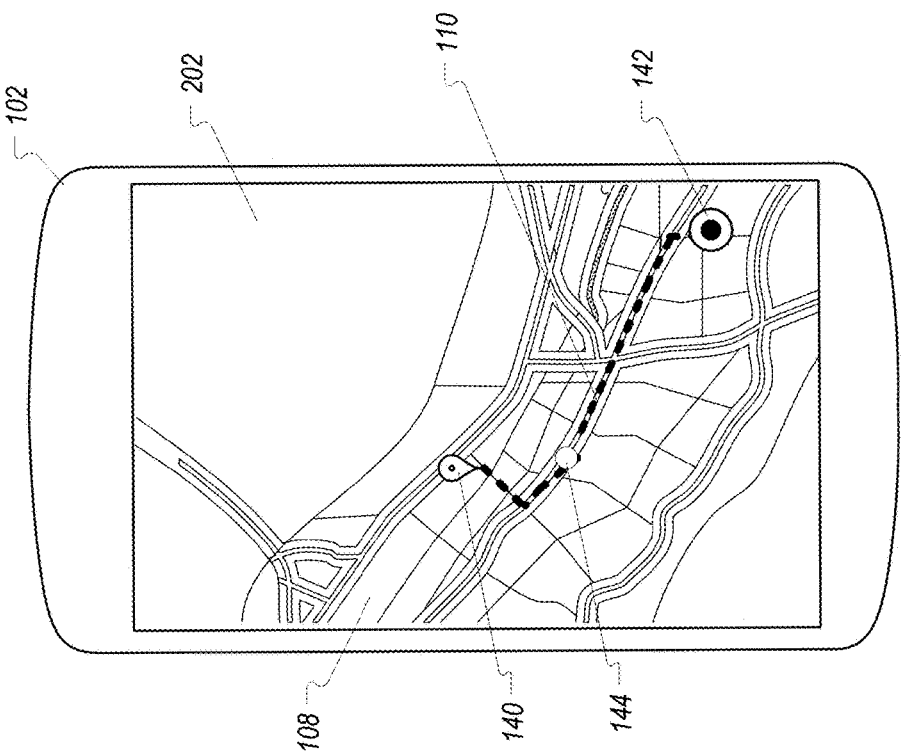

Additional user interactions with the user interfaces of the mobile device 102 and the computing device 118 and communications between the mobile device 102 and computing device 118 will now be described with respect to FIGS. 2A-2N. FIG. 2A shows a user interface 202 of the mobile device 102 while FIG. 2B shows a corresponding user interface 204 of the computing device 118. The user interface 202 includes the map display 108 displaying the route 110 from the user's origin location 140 to the location 142 of the store 106. In this example, the user interface 202 further includes an icon 144 displayed on the map display 108 showing the user's progress along the route 110. As previously described, the mobile device 102 can provide location information to the server system 116 (e.g., in situations in which the user has granted the dedicated application permission to access location information for the mobile device 102). The server system 116 can use a series of received location information communications to identify that the user has begun to travel along the route 110 toward the store 106.

For example, the server system 116 can identify that first received location information indicates that the mobile device 102 is located at the origin location 140, then identify that second received location information indicates that the mobile device 102 has moved to a second location that is along the route 110, and subsequently identify that third received location information indicates that the mobile device 102 is currently located at the location indicated by the icon 144, which is even further along the route 110. Based on these changes in location of the mobile device 102 along the route 110 to the store 106, the server system 116 determines that the user has begun to travel toward the store 106. The server system 116 can also receive ETA information from the mobile device 102 along with one or more of the location information communications, can calculate an ETA for the user based on most recently received location information, or can communicate with a mapping system to determine an ETA. For example, the server system 116 can provide the most recently received location information for the mobile device 102 to a mapping system along with an indication of the location of the store 106. The mapping system can provide routing information to the server system 116 and/or an estimated time until arrival at the store 106 for the mobile device 102 (i.e., an estimated time for the user to complete travel along the route 110 to the location 142).

In response to determining that the user has begun to travel toward the store 106, the server system 116 provides a notification to the computing device 118 to prompt the computing device 118 to provide a notification to the employee that the user is on the way via the user interface 204. The notification from the server system 116 communicated to the computing device 118 can include additional information such as the ETA for the user, an identifier for the user (e.g., name, user id, customer number, etc.), an identifier for the order (e.g., an order number), information on the type of fulfillment for the order (e.g., drive-up fulfillment or in-store pickup fulfillment) and/or other information associated with the order. As discussed above, the server system 116 can communicate directly with the computing device 118 via the network 114 or, in some implementations, can communicate with a central computer located at the store 106 which in turn relays information to the computing device 118. For purposes of brevity, further communications will be described as being directly between the server system 116 and the computing device 118 but should be understood to also to cover communications of information that are relayed to the computing device 118 through one or more other computing devices from the server system 116.

In response to receiving the notification that the user has begun to travel toward the store 106, the computing device 118 causes the user interface 204 to display a notification to the employee. The computing device 118 can also provide audio (e.g., ringing, text to speech) or tactile (e.g., vibration) output to notify the employee that the user is on the way. In the example depicted in FIG. 2B, the user interface 204 is displaying a lock screen for the computing device 118. The computing device 118 can provide a notification 206 on the lock screen that indicates that a new user is on the way to the store 106. The notification 206 includes an indicator 208 that a guest is on the way (i.e., the user has begun to travel toward the store 106). The notification 206 further includes an order identifier 210 that includes an order number for the user's order and an indicator 212 of the estimated time until the user arrives at the store 106. In this example, the notification 206 indicates that the user is estimated to arrive in 23 minutes. In some implementations, the notification 206 can indicate a time that the user is estimated to arrive. For example, the notification 206 can indicate "arriving at 5:24 pm." In some implementations, the employee can select the notification 206 or a control displayed as part of the notification 206 to cause the computing device 118 to display a page of the order fulfillment application that includes additional details on the order, customer, or related info. In some implementations, the notification does not include an estimated time of arrival or estimated time until arrival. For example, the notification 206 can indicate "guest is on the way" or a similar notification while linking to order details included in a display of the order fulfillment application.

The notification 206 further includes an icon 214 indicating that the user has selected drive-up order fulfillment for the order. In some implementations, the notification 206 can include more or less information. For example, the notification can include the user's name, vehicle identification information, an indication of a location for the order (e.g., one or more bins in a staging area), an indication that perishable goods for the order need to be collected, or other information related to the order.

Figure 2D:
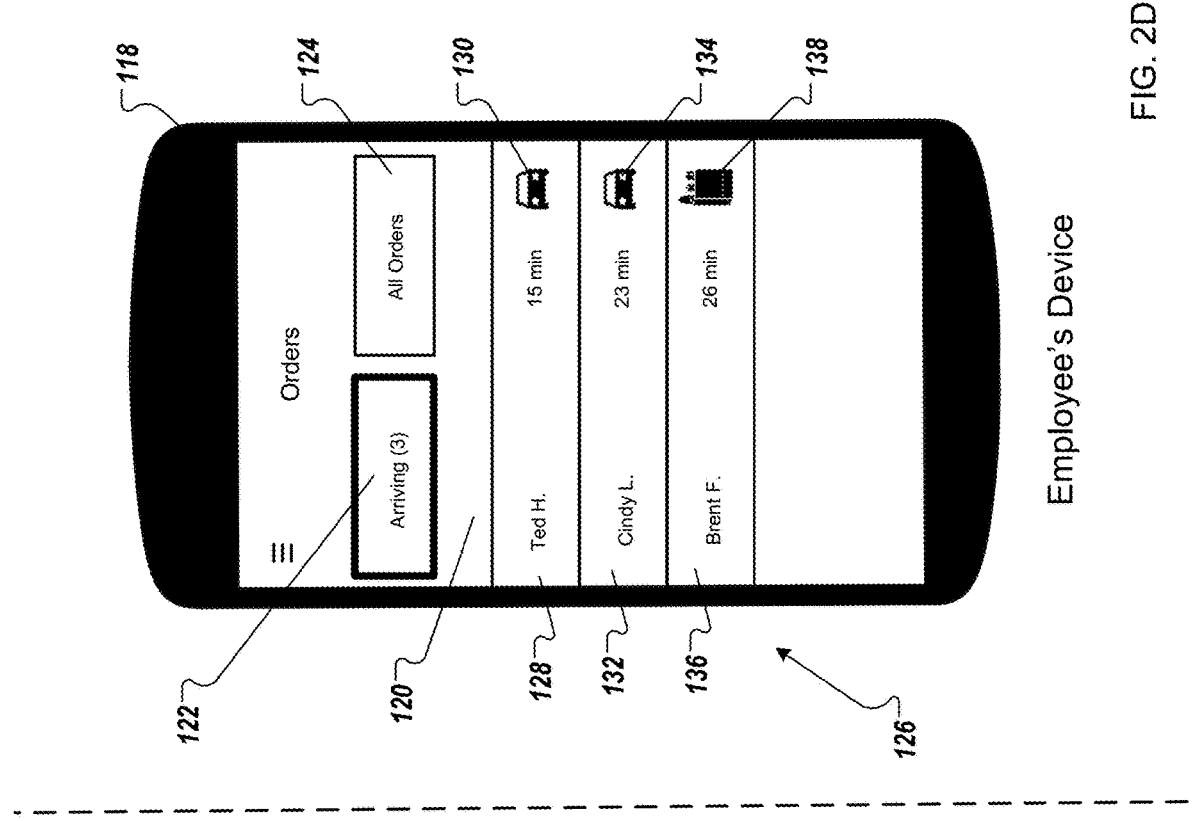
Figure 2C:
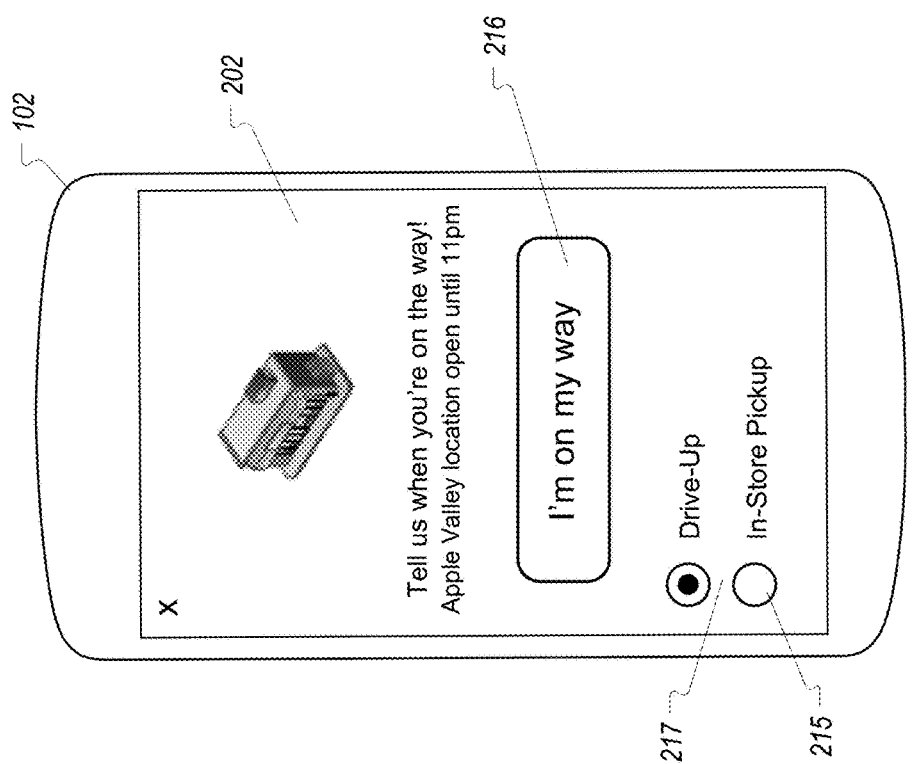

FIG. 2C shows an alternate version of the user interface 202. The version of user interface 202 shown in FIG. 2C can be employed, for example, when the user has not permitted the dedicated application to access location information for the mobile device 102 or in situations in which the mobile device 102 is unable to determine a location (e.g., tall buildings blocking GPS signals). The user interface 202 can include instructions to the user to indicate when they have begun to travel toward the store 106 and other relevant information, such as store hours for the store 106. The user interface 202 further includes a user selectable icon 216 that allows the user to indicate that they have begun to travel toward the store 106. Upon selection of the icon 216 by the user, the mobile device 102 communicates with the server system 116 to indicate that the user has begun to travel toward the store 106. In some implementations, the server system 116 can determine an estimated time of arrival for the user based on an initial location for the route to the store 106 (such as the user's home address, which can be stored as part of the user's profile information) as described above (e.g., by performing calculations or by communicating with a mapping system). The server system 116 can then communicate with the computing device 118 to notify the employee that the user is on the way, as described above.

In some implementations, in response to the user opening the dedicated application or in response to the user selecting the icon 216, the dedicated application can request temporary access to location information for the mobile device 102. If the user permits the dedicated application temporary access to location information (e.g., only while the dedicated application is open), the dedicated application can provide the mobile device 102 location information to the server system 116 to assist the server system 116 in identifying the estimated time of arrival of the user at the store 106, as described above.

In some implementations, the user interface 202 includes a control 217 that allows the user to change the order fulfillment type. In the example shown in FIG. 2C, the control 217 indicates that the user has selected drive-up order fulfillment and further includes an option to change the order fulfillment type to in-store pickup. For example, the user may have indicated drive-up order fulfillment at the time of placing the order and now that the user has begun to travel toward the store 106, the control 217 now indicates that the user's order is designated for drive-up order fulfillment. The user can interact with the control 217 to change the order fulfillment type to in-store pickup, e.g., by selecting a selection area 215 next to an indication for "In-Store Pickup." For example, the user may decide after initially placing the order that they would like to enter the store 106 to shop for additional items in person and then retrieve the online order when exiting the store 106. Selection of the selection area 215 by the user can cause the user interface 202 to change to indicate that the user has changed the order fulfilment type to in-store pickup.

As another example, the user may have initially selected in-store pickup order fulfillment at the time of placing the order. For example, the user may have initially placed the order using a home computer such as a laptop or desktop computer and selected an option for in-store pickup fulfillment at the time of placing the order. Later on, the user accesses the previously placed order using the dedicated application executing on the mobile device 102. The user may then decide to change the order fulfillment type from in-store pickup (the originally selected fulfillment type) to drive-up order fulfillment. For example, it may have started raining, so the user may not wish to exit their vehicle, or the user may be in a hurry and not want to take the time to enter the store. As another example, the user may have intended to utilize drive-up fulfillment when placing the order but inadvertently selected in-store pickup fulfillment (e.g., in-store pickup fulfillment may have been the default option). The user can change the order fulfillment type by interacting with the control 217 to change the order fulfillment type to drive-up fulfillment. Selection of the control 217 to change the order fulfillment type can cause the dedicated application to provide additional information, such as through display of a different user interface triggered by selection of the control 217.

Figure 2E:
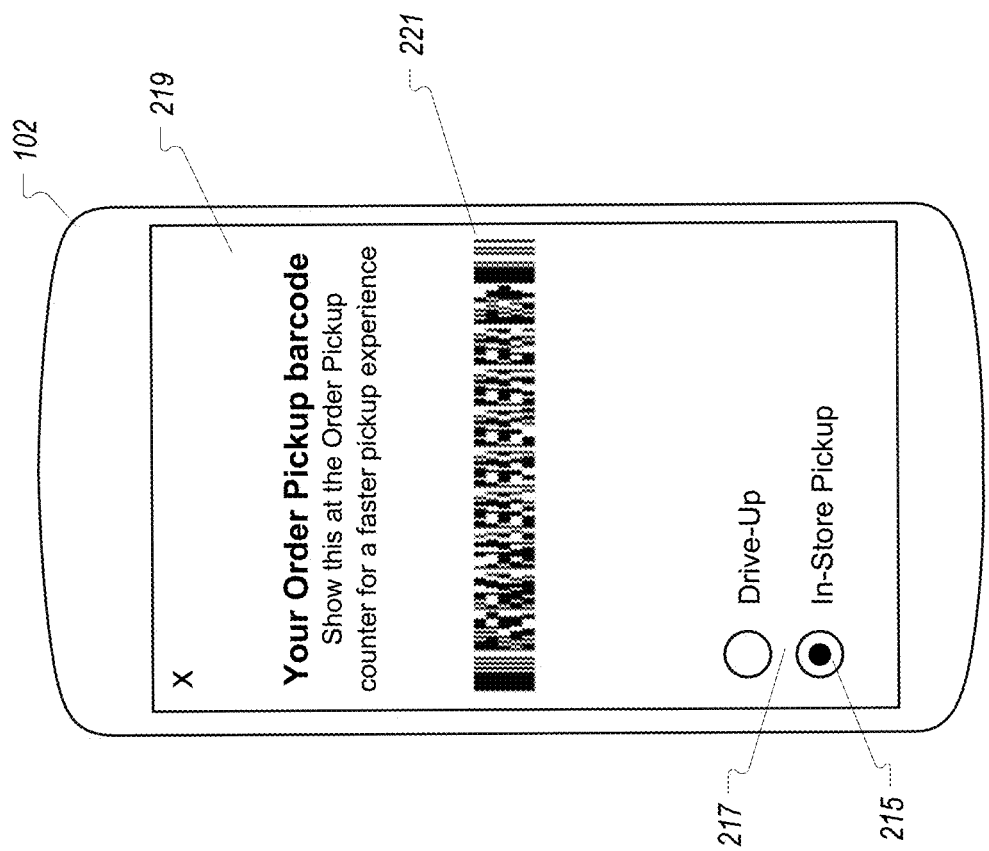

For example, FIG. 2E shows a user interface 219 for the mobile device 102 that is displayed in response to selection of the selection area 215 of the control 217 on the user interface 202 of FIG. 2C to change the order fulfillment type from drive-up fulfillment to in-store pickup fulfillment. As shown, the user interface 219 includes the control 217 with the selection area 215 shown as selected, indicating that the user has selected in-store pickup fulfillment for the order. The user interface 219 includes a barcode 221 that the user can use to facilitate an in-store pickup order. The barcode 221 can be a unique barcode that is associated with the user. In other implementations, the barcode 221 can be a unique barcode that is associated with the user's order or associated with all active orders for the user. In such implementations, the barcode 221 can change between each order for the same user. In some implementations, the barcode 221 is tied to a specific payment method. In some implementations, another verification method can be used, such as a matrix barcode, a unique character string, or other unique indicator.

The barcode 221 can be scanned by the employee, e.g., using the computing device 118, to verify the user's identity and verify that the order was provided to the user at, for example, an in-store pickup kiosk or counter. For example, the employee can retrieve the bags for the user's order from appropriate storage bins located at or near the in-store pickup fulfillment location and provide the bags containing the user's order to the user. The employee can then scan the barcode 221. The computing device 118 can then provide a notification indicating that the scanned barcode 221 matches the user or the user's order to ensure that the employee has provided the correct order to the user. Scanning of the barcode can also cause the computing device 118 to display information indicating that the user has already paid for the order.

Continuing with FIG. 2E, the user can interact with the control 217 displayed as part of the user interface 219 to change the order fulfillment type from in-store pickup to drive-up fulfillment. In some implementations, the user may select the control 217 as many times as desired to switch between drive-up and in-store pickup fulfillment up until the time that the order is fulfilled. For example, the user may initially select in-store pickup fulfillment, then change the fulfillment type to drive-up upon getting into her vehicle because it has started raining, and then change the fulfillment type back to in-store pickup when approaching the store because the rain has stopped. Selection of the control 217 on the user interface 219 can cause the order fulfillment type to switch from in-store pickup to drive-up fulfillment and can further cause the dedicated application to display the user interface 202 of FIG. 2C.

Selection of the control 217 to change the fulfillment type from in-store pickup to drive-up fulfillment can, in some implementations, cause the dedicated application to provide additional user interface displays to the user. For example, selection of the control 217 by the user to change the fulfillment type from in-store pickup to drive-up fulfillment can trigger the dedicated application to display a user interface that prompts the user to enter vehicle identification information such as color, vehicle type, vehicle make, vehicle model, or a full or partial license plate number. For example, selection of the control 217 by the user to change the fulfillment type from in-store pickup to drive-up fulfillment can trigger the dedicated application to display a number of icons with different colors to allow the user to easily select a vehicle color. As another example, selection of the control 217 by the user to change the fulfillment type from in-store pickup to drive-up fulfillment can trigger the dedicated application to display a number of icons each displaying a different vehicle type (e.g., SUV, sedan, minivan, motorcycle, bicycle), to allow the user to easily indicate her vehicle type. In some implementations, the user selectable icons for vehicle color and vehicle type are displayed simultaneously by the dedicated application. In some implementations, the dedicated application is triggered to display the above described user interfaces for prompting the user to enter vehicle information by user selection of the "I'm on my way" user selectable icon 216.

Additionally, in response to the user changing the order fulfillment type, the mobile device 102 will communicate with the server system 116 to indicate that the user has changed the order fulfillment type. The server system 116 can access a database storing information about the order and change the order fulfillment type for the order in response to receiving the communication. The server system 116 can also communicate with the computing device 118 to indicate to the computing device 118 that the order fulfillment type for the order has been changed. In some implementations, the control 217 can be included as a part of other user interface displays, such as the version of user interface 202 shown in FIG. 2A or as part of other user interface displays for mobile device 102 described with respect to later figures. In some implementations, the user can interact with another control, such as a menu control or action item control to access a user interface screen that includes the control 217.

FIG. 2D shows the computing device 118 displaying the user interface 120 of FIG. 1. In this example, the user selectable control 122 is selected to cause the user interface 120 to display the list 126 orders for which the user is currently on the way and/or has already arrived. As previously described, the order listings 128, 132, and 136 provide identification information for users who are on the way to the store 106, information on ETA for each user, and icons indicating fulfillment type for each order. The user interface 120 can be displayed by the computing device 118, for example, in response to the employee selecting the notification 206 of FIG. 2B and then unlocking the computing device 118, such as by entering a security code or scanning a fingerprint. As another example, the employee may already have unlocked the computing device 118 and be viewing the application executing on the computing device 118. In response to the computing device 118 receiving the notification from the server system 116 that the user has begun to the travel toward the store 106, the computing device 118 updates the user interface 120 to include the user's order in the arriving orders list 126.

For example, the user of the mobile device 102 may be Cindy L. Upon the server system 116 detecting that that Cindy has begun to travel the route 110 toward the store 106 and/or upon selection of the icon 216 by Cindy, the server system 116 provides a notification to the computing device 118 indicating that Cindy is on the way. This can cause the computing device 118 to update the user interface 120 to include the order listing 132 for Cindy's order, which had not previously been displayed as part of the user interface 120. As each of the user's associated with the orders indicated by the order listings 128, 132, and 136 continue to travel toward the store 106, the ETA for each user can be periodically updated on the user interface 120 to keep the employee updated on the status of each user.

As described above, in some implementations, the user can interact with the mobile device 102 to change the order fulfillment type after an order has already been placed, such as, for example, by interacting with the control 217. When a user changes the order fulfillment type, the mobile device 102 communicates with the server system 116 which in turn communicates with the computing device 118 to indicate to the computing device 118 that the order fulfillment type for the order has changed. The computing device 118 can then update the user interface 120 to reflect the change in order fulfillment type and notify the employee of the change. For example, in the example shown in FIG. 2D, if Cindy L. uses the control 217 to change her desired order fulfillment type from drive-up to in-store pickup, the icon 134 displayed for order listing 132 will change from a car (as shown in FIG. 2D) to a grocery bag, such as that displayed for icon 138. In some implementations, when the order fulfillment type for an order changes, the computing device 118 can cause the associated icon (e.g., the icon 134) to blink, change color (e.g., black to red), or otherwise change visually to alert the employee to the change in order fulfillment type. The computing device 118 can also provide a notification to the employee indicating that the order fulfillment type has changed in response to receiving a communication from the computing device 118 that the order fulfillment type has changed.

Figure 2G:
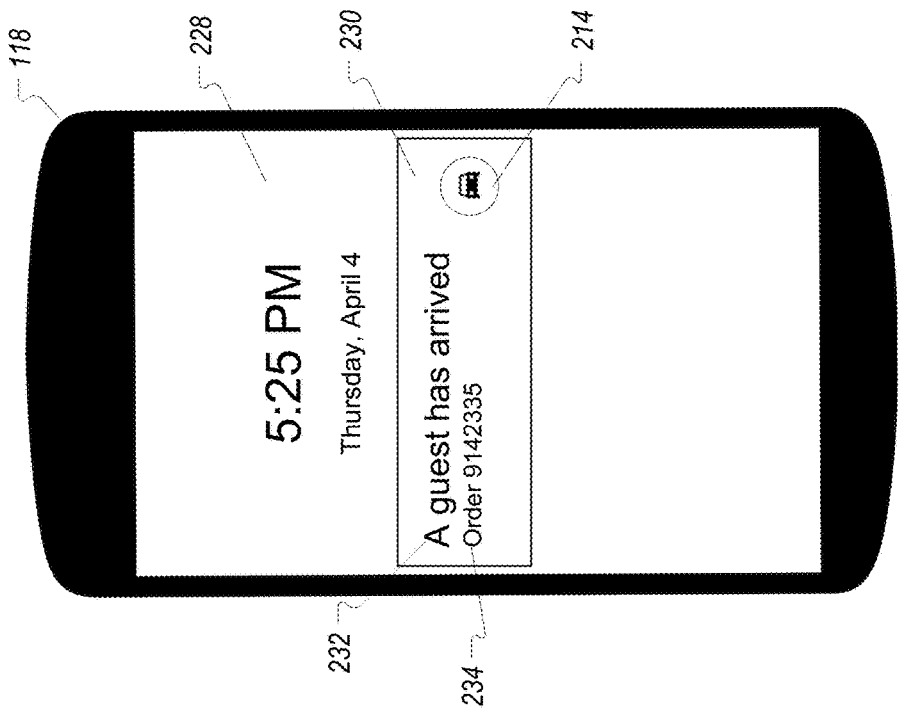
Figure 2F:
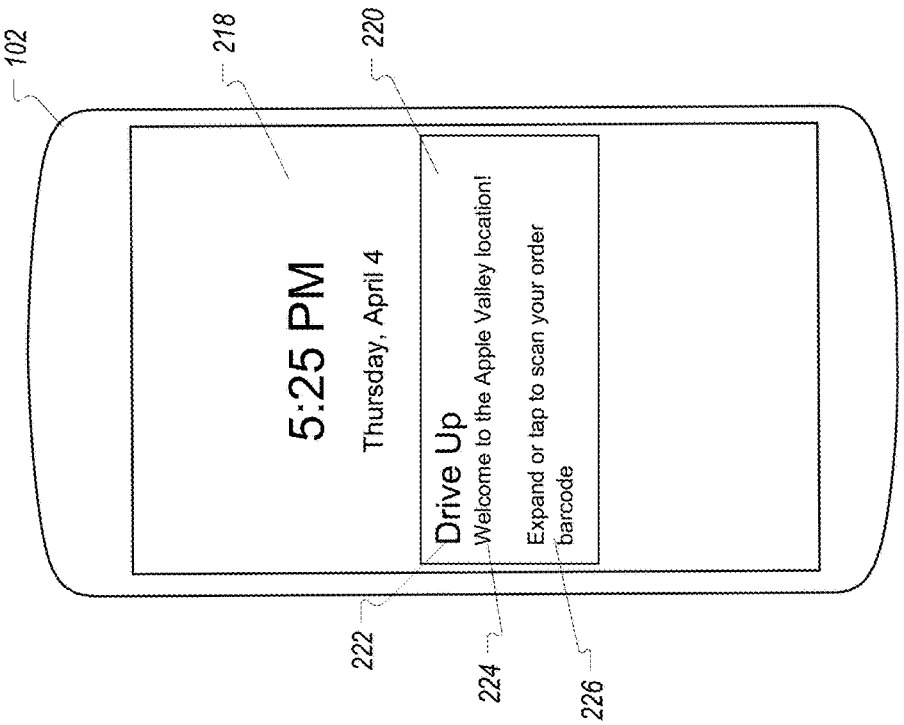

FIG. 2F shows a user interface 218 for the mobile device 102. In this example, the user interface 218 is a lock screen for the mobile device 102. The user interface 218 is an example user interface for situations in which the user has granted permission for the dedicated application to continually access location information for the mobile device 102 (e.g., "always on"). The user interface 218 includes a notification 220 that is displayed in response to a determination that the mobile device 102 as arrived at the store 106. For example, the mobile device 102 can be identified as having arrived at the store 106 upon the location of the mobile device 102 indicating that the mobile device 102 is located within the parking lot of the store 106. As another example, the mobile device 102 can be identified as having arrived at the store 106 upon the location of the mobile device 102 indicating that the mobile device 102 is located within a specified distance of the store 106 (e.g., 300 meters).

The determination that the mobile device 102 has reached the store 106 can be made by the mobile device 102 or by the server system 116. For example, as the user progresses along the route 110, the mobile device 102 can continue to provide location information for the mobile device 102 to the server system 116. Upon the server system 116 receiving location information indicating that the mobile device 102 has arrived at the store 106 (e.g., is located in the parking lot of the store 106), the server sends a notification to the mobile device 102 which causes the dedicated application to provide the notification 220 to the user. As another example, the dedicated application can perform the determination by comparing location information for the mobile device 102 to information indicating the location of the store 106 and/or location information for the parking lot of the store 106 to determine when the user has arrived at the store 106. Upon determining that the user has arrived at the store 106, the dedicated application causes the mobile device 102 to display the notification 220. The dedicated application can further cause the mobile device 102 to transmit a communication to the server system 116 indicating that the user has arrived at the store 106.

The notification 220 includes an indication 222 of the dedicated application (e.g., text and/or an icon) to help the user to readily distinguish that the notification 220 is related to drive-up order fulfillment from notifications related to other applications installed on the mobile device 102. The notification 220 further includes a greeting 224 and instructions 226 for next steps for the user. In the example shown in FIG. 2F, the instructions 226 indicate that the user can select the notification 220 (and subsequently unlock the mobile device 102) to cause the dedicated application to display a barcode to be scanned by the employee to complete the order. As another example, the instructions 226 can instruct the user where to park for drive-up fulfillment.

FIG. 2G shows an example user interface 228 of the computing device 118 containing a notification 230 that is displayed in response to the user arriving at the store 106. For example, upon the server system 116 determining that the user has arrived at the store 106 or receiving a communication from the mobile device 102 indicating that the user has arrived at the store 106, the server system 116 sends a communication to the computing device 118 to cause the computing device 118 to display the notification 230.

The computing device 118 can also provide audio (e.g., ringing, text to speech) or tactile (e.g., vibration) output to notify the employee that the user has arrived. In the example depicted in FIG. 2G, the user interface 228 is displaying a lock screen for the computing device 118. The computing device 118 can provide the notification 230 on the lock screen that indicates that the user has recently arrived at the store 106. The notification 230 includes an indicator 232 that a guest has arrived (i.e., the user has arrived in the parking lot). The notification 230 further includes an order identifier 234 that includes an order number for the user's order.

The notification 230 further includes the icon 214 indicating that the user has selected drive-up order fulfillment for the order. In some implementations, the notification 230 can include more or less information. For example, the notification can include the user's name, vehicle identification information, an indication of a location for the order (e.g., one or more bins in a staging area), an indication that perishable goods for the order need to be collected, or other information related to the order.

FIG. 2H shows an alternate arrival user interface 236 for the mobile device 102. The user interface 236 shown in FIG. 2H can be employed, for example, when the user has not permitted the dedicated application to access location information for the mobile device 102 or in situations in which the mobile device 102 is unable to determine a location (e.g., tall buildings blocking GPS signals). The user interface 236 can include instructions to the user on where to park for drive-up fulfillment and can also provide instructions to prompt the user to indicate when they have arrived. The user interface 236 includes a user selectable icon 238 that allows the user to indicate that they have arrived at the store 106. Upon selection of the icon 238 by the user, the mobile device 102 communicates with the server system 116 to indicate that the user has arrived at the store 106. In some implementations, the user interface 236 includes a user selectable control 240 that allows the user to view details on the order.

In some implementations, the user interfaces provided by the mobile device 102 can include an indication of the user's progress in completing order fulfillment. For example, the user interface 236 can included indicators for various steps of the order fulfillment process for the user and indicate which steps have already been completed by the user and the current step that the user is engaged in. For example, the user interface 236 can include indications of steps for "order successfully submitted," "order is ready for pickup," "you're on your way," "you've arrived at the store," "team member is walking to your vehicle," and "order complete." As each step in the process is completed, the user interface indicates that the step has been completed by, for example, placing a checkmark next to the step. Such a visualization can help to reassure the user that the order is being fulfilled and that the system is aware of the user's progress in fulfilling the order.

FIG. 2I shows the computing device 118 displaying an updated version of the user interface 120 of FIG. 1 and FIG. 2D. In this example, the user selectable control 122 is selected to cause the user interface 120 to display the list 126 orders for which the user is currently on the way and/or has already arrived. The list 126 has been updated such that the order listing 128 is no longer present, indicating that fulfillment of the order associated with the order listing 128 has been completed (e.g., the associated user has received their order). The order listings 132 and 136 have been updated to indicate updated statuses for the users associated with those respective orders. For example, the order listing 136 indicates that Brent F. is now 2 minutes away.

Furthermore, the user interface 120 has updated to indicate that Cindy L. has now arrived at the store and has switched the estimated time of arrival indication for the order listing 132 to a time since arrival timer 242. In other words, the timer 242 in the order listing 132 has switched from a count-down timer indicating an estimated time until arrival of Cindy to a count-up timer indicating the amount of time since Cindy arrived at the store 106. In some implementations, when the timer 242 switches from a count-down, ETA timer to a count-up, time since arrival timer, the user interface 120 will change the appearance of the timer 242. For example, the user interface 120 changes the color of the timer 242 when it transitions from a count-down, ETA timer to a count-up, time since arrival timer. For example, the timer 242 can be displayed in grey during count-down, ETA timer mode and then can be displayed in green when the timer 242 switches to a count-up, time since arrival timer. In the example shown in in FIG. 2I, in response to switching from a count-down, ETA timer to a count-up, time since arrival timer, the timer 242 has switched from a regular font to an underlined, bold font. Other appearance changes, such as italics, flashing, change in size, change in location, change in background color for the order listing 132, a box or circle around the timer 242, or other display change can be used to visually indicate to the employee that the user (Cindy) has arrived and that timer 242 has switched to a time since arrival timer.

In a preferred implementation, the timer 242 does not transition from a count-down, ETA timer to a count-up, time since arrival timer in response to the count-down timer reaching zero, but rather the timer 242 transitions from a count-down, ETA timer to a count-up, time since arrival timer upon the computing device 118 receiving a communication from the server system 116 indicating that the user has arrived at the store 106. The timer 242 therefore transitions from a count-down, ETA timer to a count-up, time since arrival timer in response to the received notification regardless of if a previous ETA timer indicated additional time until the user was estimated to arrive and regardless of if the ETA timer had previously reached zero. In such implementations, the transition of the 242 from a count-down, ETA timer to a count-up, time since arrival timer is solely dependent upon the computing device 118 receiving a notification that the user associated with the order listing 132 has arrived at the store 106.

In some implementations, the user interface 120 as shown in FIG. 2I can be displayed by the computing device 118, for example, in response to the employee selecting the notification 230 of FIG. 2G and then unlocking the computing device 118, such as by entering a security code or scanning a fingerprint. As another example, the employee may already have unlocked the computing device 118 and may be viewing the application executing on the computing device 118. In response to the computing device 118 receiving the notification from the server system 116 that the user has arrived at the store 106, the computing device 118 updates the user interface 120 to transition the timer 242 from a count-down, ETA timer to a count-up, time since arrival timer.

For example, the user of the mobile device 102 may be Cindy L. Upon the server system 116 determining that Cindy has arrived at the store 106 (e.g., based on location data of the mobile device 102 or based on receiving a communication from the mobile device 102 indicating arrival at the store 106), the server system 116 provides a notification to the computing device 118 indicating that Cindy has arrived. This can cause the computing device 118 to update the user interface 120 to transition the timer 242 from a count-down, ETA timer to a count-up, time since arrival timer, regardless of the previously displayed ETA for Cindy. Additionally, the user interface 120 can be updated to indicate an updated ETA for Brent.

In some implementations, the timer 242 can change appearance again after a predetermined amount of time has elapsed since arrival of the user at the store 106. For example, upon reaching 3:00, the timer 242 can change to red and begin to blink. Additionally, the computing device 118 can emit an audible, tactile, or additional visual alarm (e.g., a blinking light) upon the timer 242 reaching the predetermined time. Such alarms and change in appearance of the timer 242 can help to catch the employee's attention and inform the employee that the user has been waiting for a period of time determined to be longer than usual or longer than is desirable.

In some implementations, upon the timer 242 reaching the predetermined time, the computing device 118 can communicate with the mobile device 102 (e.g., through the server system 116) to cause the mobile device 102 to display a customized notification to the user. For example, the computing device 118 can communicate with the mobile device 102 to inform the mobile device 102 that the customized notification can be displayed and the mobile device 102 can display a notification having an apology for the wait, indicating a status of the order (e.g., perishable items being retrieved), or offering a discount or coupon to compensate the user for the wait. In some implementations, the user interface 120 can allow the employee to provide additional information which can be communicated to the user by the mobile device 102. For example, the employee can enter a message indicating that a certain item is unavailable or indicating that the employee will bring out the user's order in a specified amount of time. For example, the employee can utilize the user interface 120 to send a message for display at the mobile device 102 stating "Sorry for the delay, your order will be out within two minutes."

Providing an updated notification to the user upon the timer 242 reaching the predetermined time can give the user confidence that one or more employees of the store 106 are aware of the user's arrival at the store 106 and that they are still working on completing the user's order and bringing it to the user's vehicle 104.

In some implementations, the count-up timer is stopped or cleared in response to an event. For example, the employee can use one or more controls of one of the user interface screens of the computing device 118 to indicate that the order has been fulfilled. Completion of the order fulfillment can cause the timer to stop or be cleared.

FIG. 2J shows an example user interface 244 that can be displayed in response to a determination that the user has arrived at the store 106. For example, upon the dedicated application determining that the user has arrived at the store, the dedicated application displays the user interface 244. As another example, the server system 116 can determine that the user has arrived at the store 106 and send a communication to the mobile device 102 to cause the mobile device 102 to display the user interface 244. The user interface 244 can include a greeting and information such as an indication that an employee of the store will arrive with the user's order soon. In some implementations, the user interface 244 can include a timer (not shown) that indicates an amount of time since the user has arrived at the store 106. In some implementations, the user interface 244 includes a user selectable icon 246 that, when selected, causes the dedicated application to display a barcode that can be scanned by the employee using the computing device 118 to verify the order.

FIG. 2K shows an example user interface 248 that can be displayed by the computing device 118 in response to selection of the order listing 132 (FIG. 2I) by the employee. For example, the employee can select the order listing 132 (or another order listing) to view details on the associated order and/or other orders associated with the user. For example, upon the employee selecting the order listing 132 displayed as part of the user interface 120, the computing device 118 displays the user interface 248 containing details on active orders placed by Cindy L.

The user interface 248 includes a header 250 containing a customer identifier, such as the customer's name. The header 250 includes user selectable controls 251 and 253 that can be used to perform additional actions or view additional information. For example, selection of the control 251 can cause the computing device 118 to display information about the customer indicated in the header 250. As another example, selection of the control 253 can allow the employee to take actions with respect to one or more selected orders associated with the customer, such as cancel an order, indicate an unavailable item, delay an order, or other actions. As another example, selection of the control 251 or the control 253 can cause the user interface 248 to display a list of items included in one or more selected active orders associated with the customer.

A field 252 of the user interface 248 indicates that the customer indicated in the header 250 has arrived and includes a timer 254 indicating the amount of time that has elapsed since the customer has arrived. In some implementations, prior to arrival of the customer, the field 252 will include an indicator of "order placed" or "on the way" to indicate the customer's status. For example, the field 252 can indicate that the customer is on the way and the timer 254 can indicate an ETA for the customer. The field 252 further includes vehicle identification information for the customer to allow the employee to more easily identify the customer's vehicle when bringing the customer's order items to the drive-up fulfillment location in the parking lot of the store 106. The field 252 further includes an icon 258 indicating that the order(s) for the customer are drive-up fulfillment orders (rather than in-store pickup, delivery, etc.).

The user interface 248 includes a field 260 indicating a first order for the customer, along with an order number for the order. The field 260 can include a checkbox 262 that can be selected when the employee wants to take an action with respect to the order indicated by the field 260. For example, the employee can select the checkbox 262 and then select the control 254 to take one or more actions with respect to the selected order, such as indicating that the employee has taken ownership of completing the order and delivering it to the customer's vehicle.

Sub-fields 264 and 266 nested under the field 260 indicate where the purchased items for the order are located. For example, the field 264 includes an indication of "FOS-A002," which can indicate that part of the order is located at the Front of Store staging area in bin A002. The field 264 includes an indicator 268 indicating the number of bags at the indicated location. In the example depicted, the field 264 indicates that there are four bags for the order located at bin FOS-A002. Similarly, field 266 includes an indicator 270 indicating that there are two bags for the order located at the bin FOA-A003. The information in the fields 264 and 266 can ensure that the employee gathers the correct number of bags for fully completing the customer's order.

In some implementations, multiple active orders can be associated with a single customer. For example, a customer may place a first order for drive-up fulfillment and later realize that they would like to purchase additional items and make a second order for drive-up fulfillment. The field 272 indicates a second active order associated with the customer. The field 272 includes a checkbox 274 that functions in a similar manner to the checkbox 262. For example, the employee can select both checkboxes 262 and 274 to take actions with respect to both orders for the customer. The sub-field 276 nested under the field 272 indicates that the second order is located at storage location "SD-A023," which can be, for example, an indication of bin A023 at a secondary staging area (e.g., for use when the front of store staging area is full, or a staging area for refrigerated and/or frozen items). The sub-field 276 includes an indicator 278 indicating that there are four bags for the second order located at storage bin SD-A023.

Figure 2M:
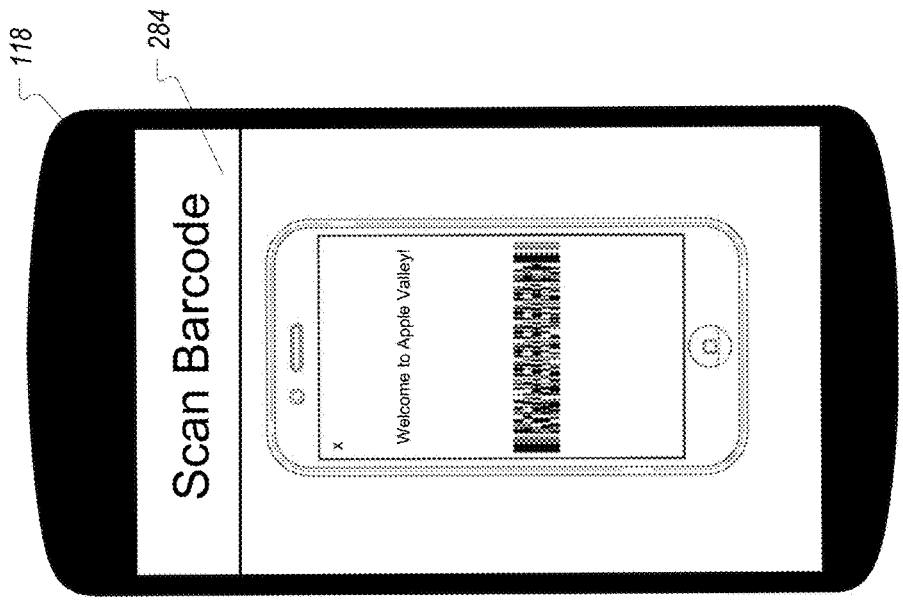
Figure 2L:
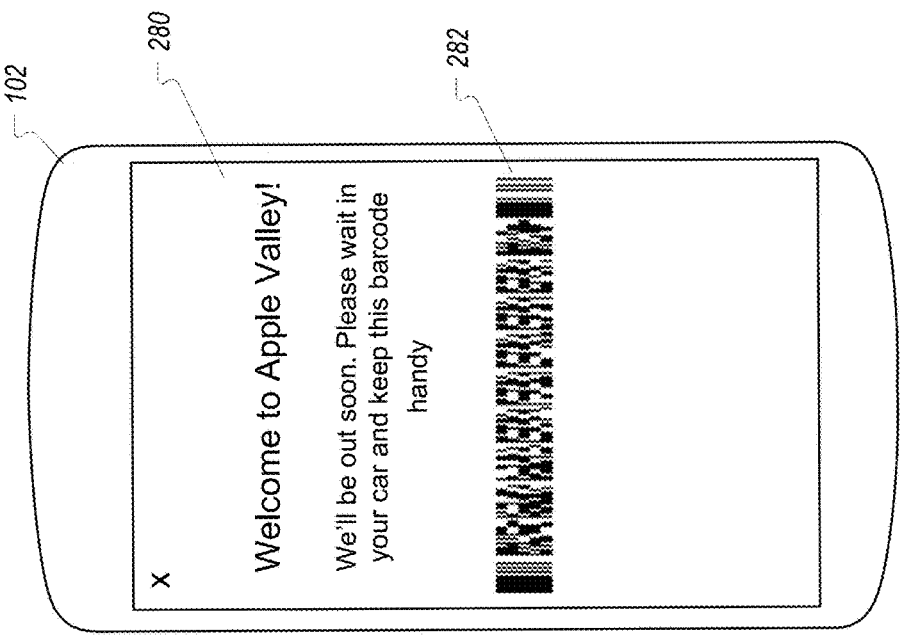

FIG. 2L shows an example user interface 280 for the user's mobile device 102 that includes a barcode 282. The user interface 280 having the barcode can be displayed, for example, in response to selection by the user of the icon 246 of FIG. 2J, selection of the notification 220 of FIG. 2E, or selection of the icon 238 of FIG. 2H. In some implementations, the user interface 280 having the barcode 282 is automatically displayed in response to a determination that the user has arrived at the store 106. In some implementations, the barcode 282 can be displayed as part of a notification on a lock screen of the mobile device 102. The barcode 282 can be a unique barcode that is associated with the user. In other implementations, the barcode 282 can be a unique barcode that is associated with the user's order or associated with all active orders for the user. In such implementations, the barcode 282 can change between each order for the same user. In some implementations, the barcode 282 is tied to a specific payment method. In some implementations, another verification method can be used, such as a matrix barcode, a unique character string, or other unique indicator.

The barcode 282 can be scanned by the employee, e.g., using the computing device 118, to verify the user's identity and verify that the order was provided to the user at the user's vehicle 104. For example, the employee can retrieve the bags for the user's order from appropriate storage bins (as indicated by the user interface 248, for example), and bring the bags out to the user's vehicle. The employee can then scan the barcode 282. The computing device 118 can then provide a notification indicating that the scanned barcode 282 matches the user or the user's order to ensure that the employee has provided the correct order to the user.

FIG. 2M shows an example user interface 284 for the computing device 118 for facilitating scanning of the barcode 282 by the employee using the computing device 118 to verify and complete the user's order. For example, the user interface 284 can prompt the employee to scan the barcode 282 displayed on the user's mobile device 102 using a camera of the computing device 118, an infrared scanner of the computing device 118, or other scanning functionality of the computing device 118. In some implementations, the user interface 284 can allow the employee to select a mechanism for scanning the barcode 282. In some implementations, the employee can select one or more input buttons of the computing device 118 to scan the barcode 282 using the camera of the computing device 118 and can select one or more other different buttons of the computing device 118 to scan the barcode 282 using the infrared scanner.

Upon scanning the barcode 282, the computing device 118 can compare identifying information (e.g., for the user or the order) associated with the barcode 282 to identifying information for the user or the order to verify that the employee is providing the correct order to the user. In some implementations, such a determination is made at a central computer of the store 106 in communication with the computing device 118 or at the server system 116.

Figure 2N:
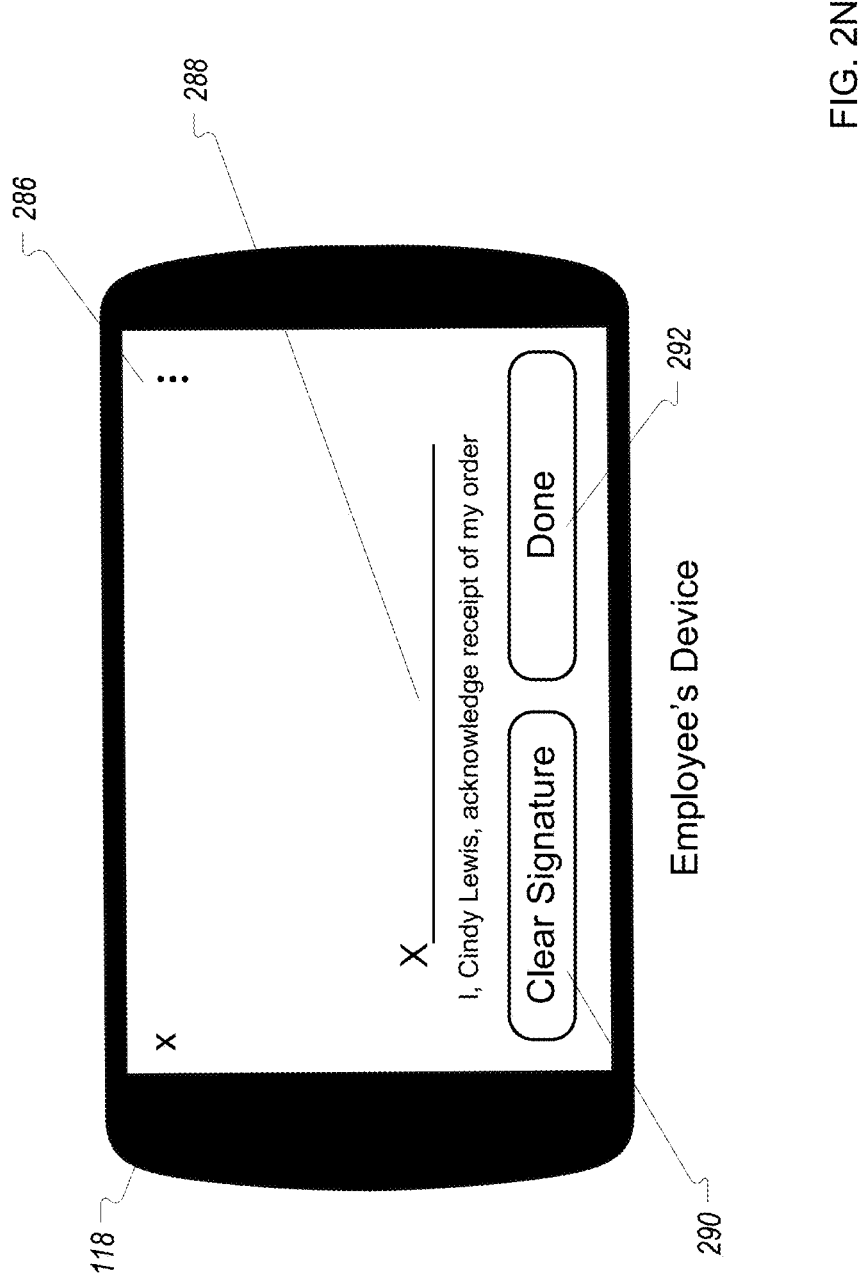

FIG. 2N shows an example user interface 286 for the computing device 118 for collecting a signature from the user. The user interface 286 can be displayed, for example, in response to a successful match of the barcode 282 scanned by the computing device 118. The user interface 286 includes a signature line 288 where the user can sign using touchscreen functionality of the computing device 118. The user interface 286 further includes a control 290 to clear the signature line 288 and a control 292 for the user to submit their signature when done signing. The computing device 118 can communicate an image of the user's signature to the server system 116 for storage in a database for later verification that the user signed for the order.

In some implementations, upon receiving the user's signature (or upon successfully scanning the barcode 282 displayed on the mobile device 102), the computing device 118 can remove the order listing associated with the user's (now completed) order from one or more user interface screens. In some implementations, reception of the user's signature and/or successful scanning of the barcode 282 causes the count-up timer indicating the time since arrival for the user to be stopped or cleared.

Figure 3:
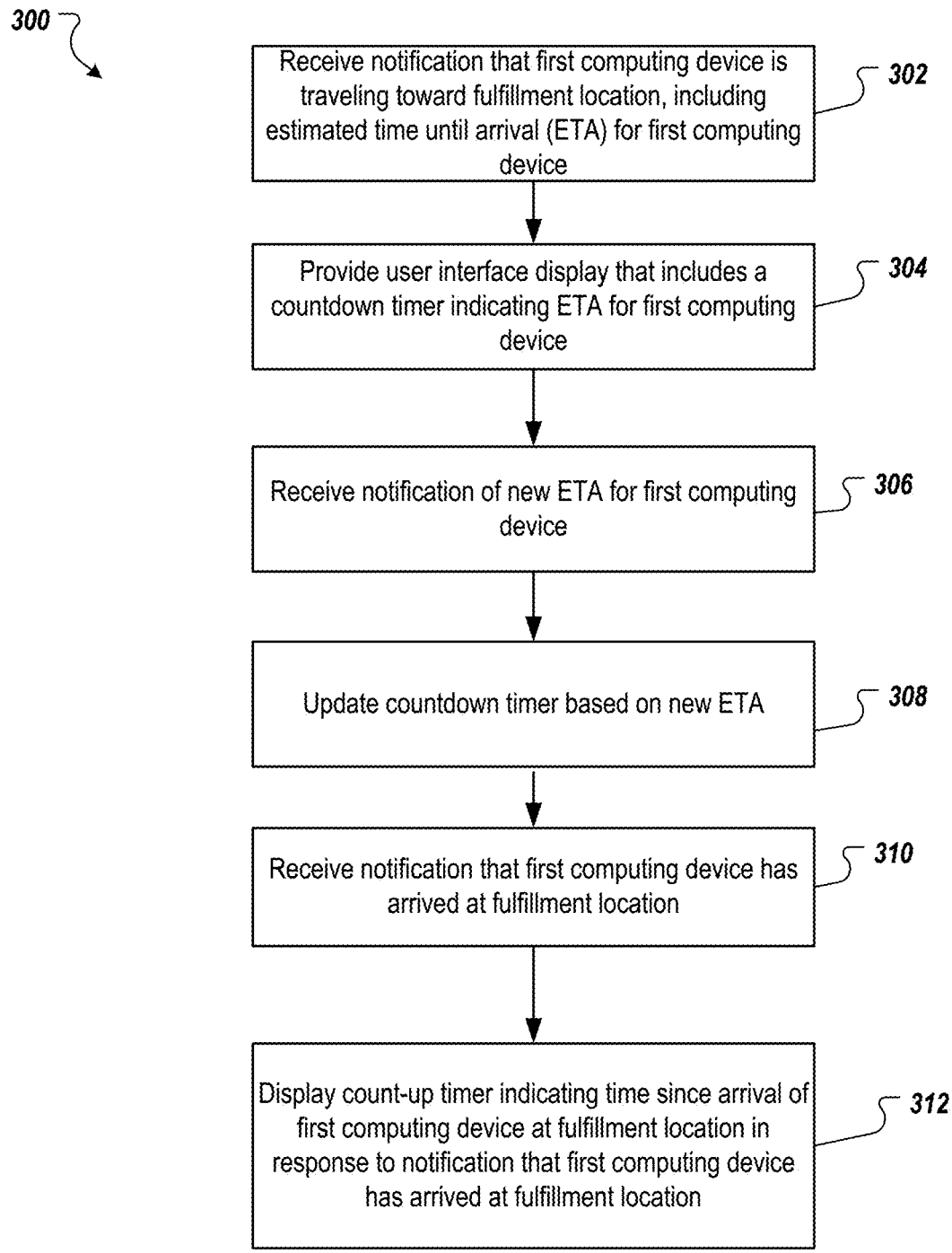
FIG. 3 is a flowchart of an example process to be performed by a computing device in a drive-up order fulfillment system.

FIG. 3 is a flowchart of an example process 300 to be performed by a computing device in a drive-up order fulfillment system. For example, the process 300 can be performed by the computing device 118 of an employee of a store. The process 300 includes receiving a notification that a first computing device has begun to travel toward a fulfillment location (302). The notification includes information an estimated time until arrival (ETA) for the first computing device. For example, the first computing device can provide location information to a remote server system. The remote server system can use the received location information to determine that the first computing device has begun to travel toward the fulfillment location. As another example, a user of the first computing device can interact with one or more user interface controls to indicate that the user has begun to travel toward the fulfillment location.

The computing device that received the notification then provides a user interface display that includes a countdown timer indicating ETA for the first computing device (304). For example, the computing device can display a timer, such as the timer shown in order listing 128 by the user interface 120 in FIG. 2D. The timer indicates an amount of time until the user of the first computing device is predicted to arrive at the fulfillment location. Alternatively, or in addition, the user interface can include a time that the user is predicted to arrive at the fulfillment location (e.g., 5:24 pm).

Next, the process 300 includes receiving a notification of a new ETA for the first computing device (306). For example, the user of the first computing device may have been delayed by traffic, may have made a stop along the way, or may have decided to take a different route. As another example, traffic congestion that was present when the original ETA was determined may have cleared up. Any of these occurrences or other factors can cause the original ETA to be incorrect. In such situations, a server system can provide a notification to the employee's computing device of the new ETA.

The employee's computing device then updates the countdown timer in response to receiving the new ETA (308). For example, prior to receiving the new ETA, the employee's computing device can continually update the countdown timer based on the original ETA and the passage of time. Upon receiving the new, updated ETA, the employee's computing device updates the countdown timer to reflect the changed condition.

The employee's computing device then receives a notification that the first computing device has arrived at the fulfillment location (310). For example, the server system can use location information for the first computing device to determine that the first computing device is located in a parking lot of the fulfillment location or another designated fulfillment area associated with the fulfillment location (e.g., designated street parking spots near the fulfillment location). As another example, the user of the first computing device can interact with a user interface of the first computing device to indicate that they have arrived at the fulfillment location. The first computing device communicates this updated status to the server system which in turn provides the notification to the employee's computing device.

The employee's computing device then displays a count-up timer indicating the amount of time since the first computing device has arrived at the fulfillment location (312). This display of the count-up timer can be performed in response to receiving the notification that the first computing device has arrived at the fulfillment location. For example, the timer 254 of FIG. 2K can be displayed in response to the computing device 118 receiving a notification that the mobile device 102 has arrived at the store 106. The displayed count-up timer can take the same form as the previously displayed countdown timer indicating the ETA for the first computing device. In some implementations, the count-up timer replaces the countdown timer and has a similar or identical appearance to the countdown timer.

In some implementations, the count-up timer can change appearance after a predetermined amount of time has elapsed since arrival of the first computing device at the fulfillment location. For example, upon reaching 4:00, the count-up timer can change color. Alternatively, or additionally, the count-up timer can begin to flash upon reaching the predetermined time. Additionally, the employee's computing device can emit an audible, tactile, or additional visual alarm (e.g., a blinking light) upon the count-up timer reaching the predetermined time. Such alarms and change in appearance of the count-up timer can help to catch the employee's attention and inform the employee that the user has been waiting for a period of time determined to be longer than usual or longer than is desirable.

Figure 4:
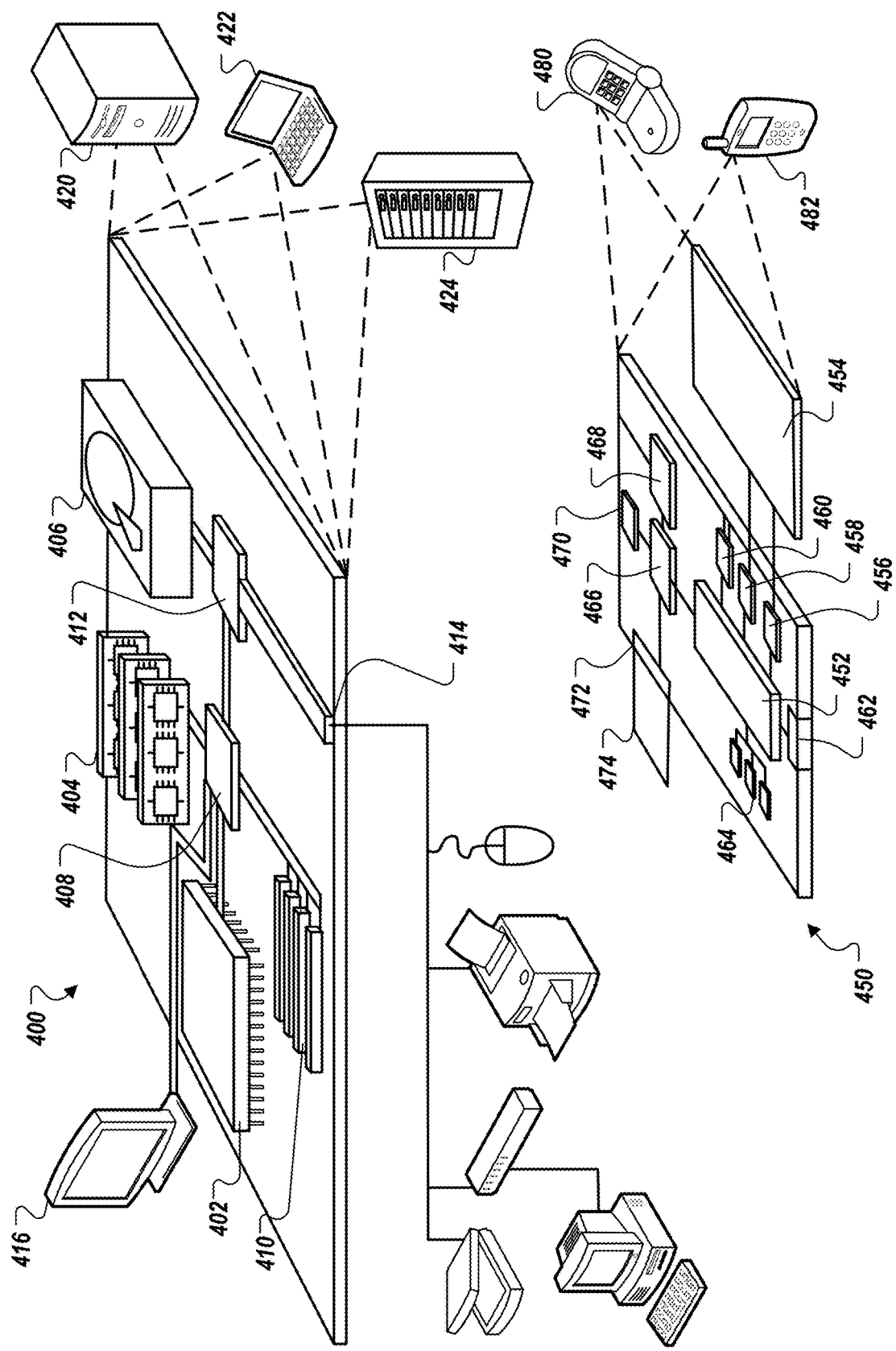
FIG. 4 is a schematic diagram that shows an example of a computing system.

FIG. 4 shows an example of a computing device 400 and an example of a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor and can be implemented in a high-level procedural and/or object-oriented programming language and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:
1. A computer-implemented method comprising:
receiving, by a first computing device, a first communication indicating that a second computing device has begun to travel toward an order fulfillment location;
receiving, by the first computing device, information indicating an estimated time until arrival at the order fulfillment location by the second computing device;
providing, by the first computing device and in response to receiving the information indicating an estimated time until arrival, a graphical user interface (GUI) that includes a first indication of the estimated time until arrival, wherein the first indication is a countdown timer;
receiving, by the first computing device, a second communication indicating that the second computing device has arrived at the order fulfillment location; and updating, by the first computing device and in response to receiving the second communication, the first indication to a second indication that the second computing device has arrived at the fulfillment location, wherein the second indication is a count-up timer, wherein the first indication continues to be presented in the GUI until the second communication is received at the first computing device regardless of whether the first indication reaches an end time.

2. The computer-implemented method of claim 1, wherein the GUI further includes graphical indications of drive-up orders and in-store pickup orders for users associated with a plurality of computing devices, wherein the plurality of computing devices includes the second computing device.

3. The computer-implemented method of claim 1, wherein the graphical indications of the drive-up orders and in-store pickup orders comprise orders that have been prepared by employees in the order fulfillment location before the users arrive at the order fulfillment location.

4. The computer-implemented method of claim 1, wherein the first computing device is an employee mobile computing device of a user working in the order fulfillment location.

5. The computer-implemented method of claim 1, wherein updating, by the first computing device, the first indication to the second indication comprises presenting the second indication in a different color than the first indication.

6. The computer-implemented method of claim 1, wherein updating, by the first computing device, the first indication to the second indication comprises presenting the second indication in a different format than the first indication.

7. The computer-implemented method of claim 1, wherein the first indication is displayed in a regular font and the second indication is presented in an underlined and bold font.

8. The computer-implemented method of claim 1, wherein updating, by the first computing device, the first indication to the second indication comprises presenting the second indication with an emphasis that includes at least one of: (i) italics, (ii) flashing, (iii) a change in font size, (iv) a change in location in the GUI, (v) a change in background color for an order listing associated with the second computing device, (vi) a box, or (vii) a circle.

9. The computer-implemented method of claim 1, wherein the end time is 0 minutes.

10. The computer-implemented method of claim 1, further comprising:
periodically and repeatedly receiving, by the first computing device, information indicating an updated estimated time until arrival at the order fulfillment location by the second computing device; and
updating, by the first computing device, the first indication based on the periodically and repeatedly received information, until the second communication is received by the first computing device.

11. The computer-implemented method of claim 1, further comprising:
presenting, by the first computing device, a notification indicating that the second computing device has arrived at the order fulfillment location;
receiving, by the first computing device, user input indicating selection of the notification; and
presenting, by the first computing device in response to receiving the user input, the GUI with the second indication at the first computing device.

12. The computer-implemented method of claim 1, further comprising updating, by the first computing device, an appearance of the second indication based on a predetermined amount of time elapsing since the second computing device arrived at the order fulfillment location.

13. The computer-implemented method of claim 12, wherein updating, by the first computing device, the appearance of the second indication comprises changing a color of the second indication.

14. The computer-implemented method of claim 12, wherein updating, by the first computing device, the appearance of the second indication comprises causing the second indication to flash.

15. The computer-implemented method of claim 1, further comprising actuating, by the first computing device, an alarm based on a predetermined amount of time elapsing since the second computing device arrived at the order fulfillment location, wherein the alarm is at least one of an audible alarm or a tactile alarm.

16. The computer-implemented method of claim 1, further comprising transmitting, by the first computing device to the second computing device, a notification indicating a status of preparing an order associated with the second computing device, the status of preparing the order being based at least in part on whether the count-up timer reached a predetermined threshold amount of time.

17. The computer-implemented method of claim 1, wherein a determination that the second computing device has begun to travel toward the order fulfillment location is made based on receiving information indicating a plurality of locations for the second computing device determined using a GPS unit of the second computing device, identifying a first location from the plurality of locations, identifying a second location from the plurality of locations that occurred after the first location, and determining that the second location is along a route to the order fulfillment location with respect to the first location.

18. The computer-implemented method of claim 17, wherein the second communication is generated, by the second computing device using the GPS unit of the second computing device, based on identifying a third location amongst the plurality of locations that corresponds to a GPS location of the order fulfillment location.

19. The computer-implemented method of claim 17, wherein the second communication is generated, by the second computing device, in response to receiving, at the second computing device, user input indicating that a user associated with the second computing device arrived at the order fulfillment location.

20. A system comprising:
one or more processors;
computer memory containing instructions that, when executed by the one or more processors, cause the system to perform operations comprising:
receiving, by a first computing device, a first communication indicating that a second computing device has begun to travel toward an order fulfillment location;
receiving, by the first computing device, information indicating an estimated time until arrival at the order fulfillment location by the second computing device;
providing, by the first computing device and in response to receiving the information indicating an estimated time until arrival, a graphical user interface (GUI) that includes a first indication of the estimated time until arrival, wherein the first indication is a countdown timer;

receiving, by the first computing device, a second communication indicating that the second computing device has arrived at the order fulfillment location; and updating, by the first computing device and in response to receiving the second communication, the first indication to a second indication that the second computing device has arrived at the fulfillment location, wherein the second indication is a count-up timer, wherein the first indication continues to be presented in the GUI until the second communication is received at the first computing device regardless of whether the first indication reaches an end time.

21. A non-transitory computer-readable medium containing instructions that, when executed by one or more processors, cause the performance of operations comprising:

receiving, by a first computing device, a first communication indicating that a second computing device has begun to travel toward an order fulfillment location;

receiving, by the first computing device, information indicating an estimated time until arrival at the order fulfillment location by the second computing device;

providing, by the first computing device and in response to receiving the information indicating an estimated time until arrival, a graphical user interface (GUI) that includes a first indication of the estimated time until arrival, wherein the first indication is a countdown timer;

receiving, by the first computing device, a second communication indicating that the second computing device has arrived at the order fulfillment location; and updating, by the first computing device and in response to receiving the second communication, the first indication to a second indication that the second computing device has arrived at the fulfillment location, wherein the second indication is a count-up timer, wherein the first indication continues to be presented in the GUI until the second communication is received at the first computing device regardless of whether the first indication reaches an end time.

* * * * *